US010999367B2

(12) United States Patent
Yoneda et al.

(10) Patent No.: US 10,999,367 B2
(45) Date of Patent: May 4, 2021

(54) COMMUNICATION APPARATUS, CONTROL DEVICE, AND COMMUNICATION METHOD

(71) Applicant: OMRON Corporation, Kyoto (JP)

(72) Inventors: Mitsuhiro Yoneda, Kyoto (JP); Taiga Niimi, Kyoto (JP); Hiroshi Sawada, Kyoto (JP); Nobuyuki Sakatani, Kyoto (JP); Hiroaki Yamada, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/337,431

(22) PCT Filed: Oct. 13, 2017

(86) PCT No.: PCT/JP2017/037173
§ 371 (c)(1),
(2) Date: Mar. 28, 2019

(87) PCT Pub. No.: WO2018/070518
PCT Pub. Date: Apr. 19, 2018

(65) Prior Publication Data
US 2020/0036786 A1 Jan. 30, 2020

(30) Foreign Application Priority Data
Oct. 14, 2016 (JP) .............................. JP2016-202964

(51) Int. Cl.
*H04L 12/28* (2006.01)
*H04L 29/08* (2006.01)
(Continued)

(52) U.S. Cl.
CPC .......... *H04L 67/1095* (2013.01); *G06F 13/36* (2013.01); *H04L 12/28* (2013.01);
(Continued)

(58) Field of Classification Search
CPC ...................................................... H04L 269/06
See application file for complete search history.

(56) References Cited

U.S. PATENT DOCUMENTS

2003/0152054 A1* 8/2003 Hirano .................. H04W 74/02
370/338
2004/0243643 A1* 12/2004 Hattrup ................... H04L 29/06
(Continued)

FOREIGN PATENT DOCUMENTS

CN 102342164 A 2/2012
CN 104202774 A 12/2014
(Continued)

OTHER PUBLICATIONS

Tatsuya Maruyama et al., "Development of Cooperation Architecture Between Communications of ICT and Control Systems for Real-Time Ethernet", Research Paper, The IEICE transactions on communications B, Oct. 1, 2013, pp. 1114-1121, vol. J96-B, No. 10, Concise explanation of relevance provided in the specification.
(Continued)

*Primary Examiner* — Guang W Li
(74) *Attorney, Agent, or Firm* — Metrolex IP Law Group, PLLC

(57) ABSTRACT

A communication apparatus connected to a network over which data is updated every predetermined cycle is provided. The communication apparatus includes first scheduling means for securing a first communication band necessary for updating every predetermined cycle, first data to be used for control of a manufacturing apparatus or a production facility, second scheduling means for securing a second communication hand necessary for delivering second data to a destination within a designated time period in a communication hand other than the first communication band of communication bands of the network, and third scheduling means for securing a third communication band for trans-
(Continued)

mitting third data in a communication band set as neither of the first communication band and the second communication band of the communication bands of the network.

12 Claims, 16 Drawing Sheets

(51) Int. Cl.
*G06F 13/36* (2006.01)
*H04L 1/12* (2006.01)

(52) U.S. Cl.
CPC ............ *H04L 67/12* (2013.01); *H04L 69/329* (2013.01); *H04L 2001/125* (2013.01)

(56) References Cited

U.S. PATENT DOCUMENTS

| | | | |
|---|---|---|---|
| 2004/0258015 A1* | 12/2004 | Bruckner | H04L 12/6418 370/329 |
| 2005/0220117 A1* | 10/2005 | Omi | H04W 72/1236 370/395.4 |
| 2009/0222704 A1 | 9/2009 | Meyer et al. | |
| 2011/0238774 A1* | 9/2011 | Maeda | H04L 47/13 709/208 |
| 2012/0002633 A1 | 1/2012 | Higashinaka et al. | |
| 2012/0246263 A1 | 9/2012 | Negishi et al. | |
| 2012/0269208 A1* | 10/2012 | Grohlich | H04L 47/125 370/536 |
| 2014/0068126 A1 | 3/2014 | Itou et al. | |

FOREIGN PATENT DOCUMENTS

| | | | | |
|---|---|---|---|---|
| EP | 2485436 A1 * | 8/2012 | ....... | H04L 12/40013 |
| EP | 2485436 A1 | 8/2012 | | |
| JP | 2004-363782 A | 12/2004 | | |
| JP | 2006-005646 A | 1/2006 | | |
| JP | 2009-506599 A | 2/2009 | | |
| JP | 2012-205142 A | 10/2012 | | |
| JP | 2013-153278 A | 8/2013 | | |
| JP | 2014-053741 A | 3/2014 | | |

OTHER PUBLICATIONS

Shinichi Motoyoshi, Overview of Industrial Ethernet PROFINET, "KEISOU" December edition, Instrumentation Control Engineering, 2005, pp. 34-37, vol. 48 No. 12, Relevance is indicated in the (translated) ISR/WO of PCT/JP2017/037173.

International Search Report ("ISR") of PCT/JP2017/037173 dated Dec. 12, 2017.

International Searching Authority ("ISA") Written Opinion ("WO") of PCT/JP2017/037173 dated Dec. 12, 2017.

Feld J., "PROFINET—Scalable Factory Communication for all Applications", IEEE International Workshop on Factory Communication Systems, 2004. Proceedings, Sep. 22-24, 2004, pp. 33-38, IEEE; Relevance is indicated in the extended European search report dated Nov. 4, 2019 in a counterpart European patent application.

Hong S. H. et al., "Bandwidth allocation scheme in CAN protocol", IEE Proceedings D. Control Theory & Applications, Jan. 25, 2000, pp. 37-44, vol. 147, No. 1, Institution of Electrical Engineers ; Relevance is indicated in the extended European search report dated Nov. 4, 2019 in a counterpart European patent application.

Hong S. H., "Bandwidth Allocation Scheme for Cyclic-Service Fieldbus Networks", IEEE/ ASME Transactions on Mechatronics, Jun. 1, 2001, pp. 197-204, vol. 6, No. 2, IEEE; Relevance is indicated in the extended European search report dated Nov. 4, 2019 in a counterpart European patent application.

Extended European search report dated Nov. 4, 2019 in a counterpart European patent application.

Chinese Office Action dated Dec. 7, 2020 in a counterpart Chinese application.

\* cited by examiner

FIG.2

| | (1)CONTROL-ORIENTED DATA | (2)CONTROL INFORMATION-ORIENTED DATA | (3)INFORMATION-ORIENTED DATA |
|---|---|---|---|
| MAIN PURPOSE | DATA FOR ACTUALLY CONTROLLING EQUIPMENT | DATA ON SETTING AND MANAGEMENT OF EQUIPMENT | DATA TO BE USED BY HIGHER-ORDER MANAGEMENT SYSTEM |
| EXAMPLE | • SERVO COMMAND VALUE/ ENCODER VALUE<br>• SENSOR ON/OFF VALUE | • SENSOR THRESHOLD VALUE<br>• INFORMATION ON FAULT CONDITION (LOG)<br>• FIRMWARE | • STATISTICAL DATA<br>• SURVEILLANCE IMAGE DATA |
| COMMUNICATION CYCLE EXAMPLE | ≤10msec | <100msec | BEST EFFORT |
| DATA SIZE | FIXED AND SMALL | VARIOUS (TYPICALLY, kbyte ORDER OR LOWER) | VARIOUS (TYPICALLY, GREATER THAN CONTROL INFORMATION-ORIENTED DATA) |

INTEGRATED OVER SINGLE NETWORK

COMMUNICATION APPARATUS, CONTROL DEVICE, AND COMMUNICATION METHOD

TECHNICAL FIELD

The present invention relates to a communication apparatus connected to a network over which data is updated every predetermined cycle, a control device including the communication apparatus, and a communication method.

BACKGROUND ART

With recent development of information and communication technology (ICT), such a system that everything from manufacturing equipment at a site to a higher-order management apparatus is integrally networked has been on the way of implementation also for production lines.

Requirements in accordance with applications and purposes are imposed on data transmitted in such a networked system. For example, though a size of data used for control of a manufacturing apparatus or a production facility (control-oriented data) is not so large, the data is required to be real-time. In contrast, though data handled by a higher-order management apparatus (information-oriented data) is not required to be real-time, data of a relatively large size should be transmitted. It is not easy to meet such mutually contradictory requirements over an identical network. In order to improve intelligence of control equipment, it is important to integrate control-oriented communication and information-oriented communication.

For example, NPL 1 has proposed a cooperation architecture of information-oriented communication and control-oriented communication. Specifically, NPL 1 discloses such a configuration that when a packet in information-oriented communication is large relative to a cycle of control-oriented communication and transmission thereof is not permitted, the packet in information-oriented communication is discarded after a prescribed number of times of consecutive failures and an interrupt is given to a CPU, so that a user is allowed to apply fragmentation in a higher-order layer based on this notification.

Japanese Patent Laying-Open No. 2004-363782 (PTL 1) discloses a configuration for improving throughput of information-oriented communication while a real-time ability of control-oriented communication is ensured. PTL 1 discloses reduction in size of a frame when control-oriented communication is highly frequently established, although a size in information-oriented communication is maximized.

CITATION LIST

Patent Literature

PTL 1: Japanese Patent Laying-Open No. 2004-363782

Non Patent Literature

NPL 1: Tatsuya Maruyama, Tsutomu Yamada, "Development of Cooperation Architecture Between Communications of ICT and Control Systems for Real-Time Ethernet," The IEICE transactions on communications B, Vol. J96-B, No. 10, pp. 1114 to 1121, Oct. 1, 2013

SUMMARY OF INVENTION

Technical Problem

For example, with informatization and sophistication of a control device (typically, a programmable logic controller (PLC)) which controls a manufacturing apparatus or a production facility, the control device often exchanges data which can be categorized into information-oriented data, in addition to control-oriented data. Rather than employing a best effort scheme for general information-oriented data, guarantee of time of arrival of such information-oriented data used by the control device should be provided in some cases. The conventional technique described above does not provide any means for solving such a problem.

A configuration for implementing data transmission suitable for a network including a control device used for control of a manufacturing apparatus or a production facility has been demanded.

Solution to Problem

According to one embodiment of the present invention, a communication apparatus connected to a network over which data is updated every predetermined cycle is provided. The communication apparatus includes first scheduling means for securing a first communication band necessary for updating every predetermined cycle, first data to be used for control of a manufacturing apparatus or a production facility, second scheduling means for securing a second communication band necessary for delivering second data to a destination within a designated time period in a communication band other than the first communication band of communication bands of the network, and third scheduling means for securing a third communication band for transmitting third data in a communication band set as neither of the first communication band and the second communication band of the communication bands of the network.

Preferably, the second scheduling means divides the second data into pieces of data each having a data size in accordance with a communication band available in each cycle and then allocates divided pieces of data to a plurality of cycles.

Preferably, the second scheduling means divides the second data in accordance with a size of data receivable by the destination and then allocates divided pieces of data to a plurality of cycles.

Preferably, the second scheduling means divides the second data and then successively transmits divided pieces of data in a cycle longer than the predetermined cycle in accordance with a condition of processing of received data at the destination.

Preferably, the second scheduling means transmits the second data or the third data a plurality of times in the predetermined cycle.

Preferably, the second scheduling means determines a condition of processing of received data at the destination based on at least one of the number of times of reception error at the destination and the number of times of failure in reception of a reception response from the destination.

Preferably, the second scheduling means gives a notification about a fault condition when delivery of the second data to the destination within the designated time period by division of the second data has failed.

Preferably, the second scheduling means changes a unit size of transmission of the second data as being divided, in accordance with the condition of communication over the network.

Preferably, the second scheduling means determines the condition of communication over the network based on at least one of the number of corrupted reception responses among reception responses from the destination and the number of notifications from the destination indicating corruption of received data.

Preferably, the third scheduling means changes a unit size of transmission of the third data as being divided, in accordance with the condition of communication over the network when change in unit size has been designated.

According to another embodiment of the present invention, a control device which controls a manufacturing apparatus or a production facility is provided. The control device includes a communication interface connected to a network over which data is updated every predetermined cycle, first scheduling means for securing a first communication band necessary for updating every predetermined cycle, first data to be used for control of the manufacturing apparatus or the production facility, second scheduling means for securing a second communication band necessary for delivering second data to a destination within a designated time period in a communication band other than the first communication band of communication bands of the network, and third scheduling means for securing a third communication band for transmitting third data in a communication band set as neither of the first communication band and the second communication band of the communication bands of the network.

According to yet another embodiment of the present invention, a method of communication over a network over which data is updated every predetermined cycle is provided. The method of communication includes securing a first communication band necessary for updating every predetermined cycle, first data to be used for control of a manufacturing apparatus or a production facility, securing a second communication band necessary for delivering second data to a destination within a designated time period in a communication band other than the first communication hand of communication bands of the network, and securing a third communication hand for transmitting third data in a communication hand set as neither of the first communication band and the second communication band of the communication bands of the network.

Advantageous Effects of Invention

According to one embodiment of the present invention, data transmission suitable for a network including a control device used for control of a manufacturing apparatus or a production facility can be implemented.

BRIEF DESCRIPTION OF DRAWINGS

FIG. 2 is a diagram showing a type of data transmitted over the networked system in FIG. 1.

DESCRIPTION OF EMBODIMENTS

Figure 1:
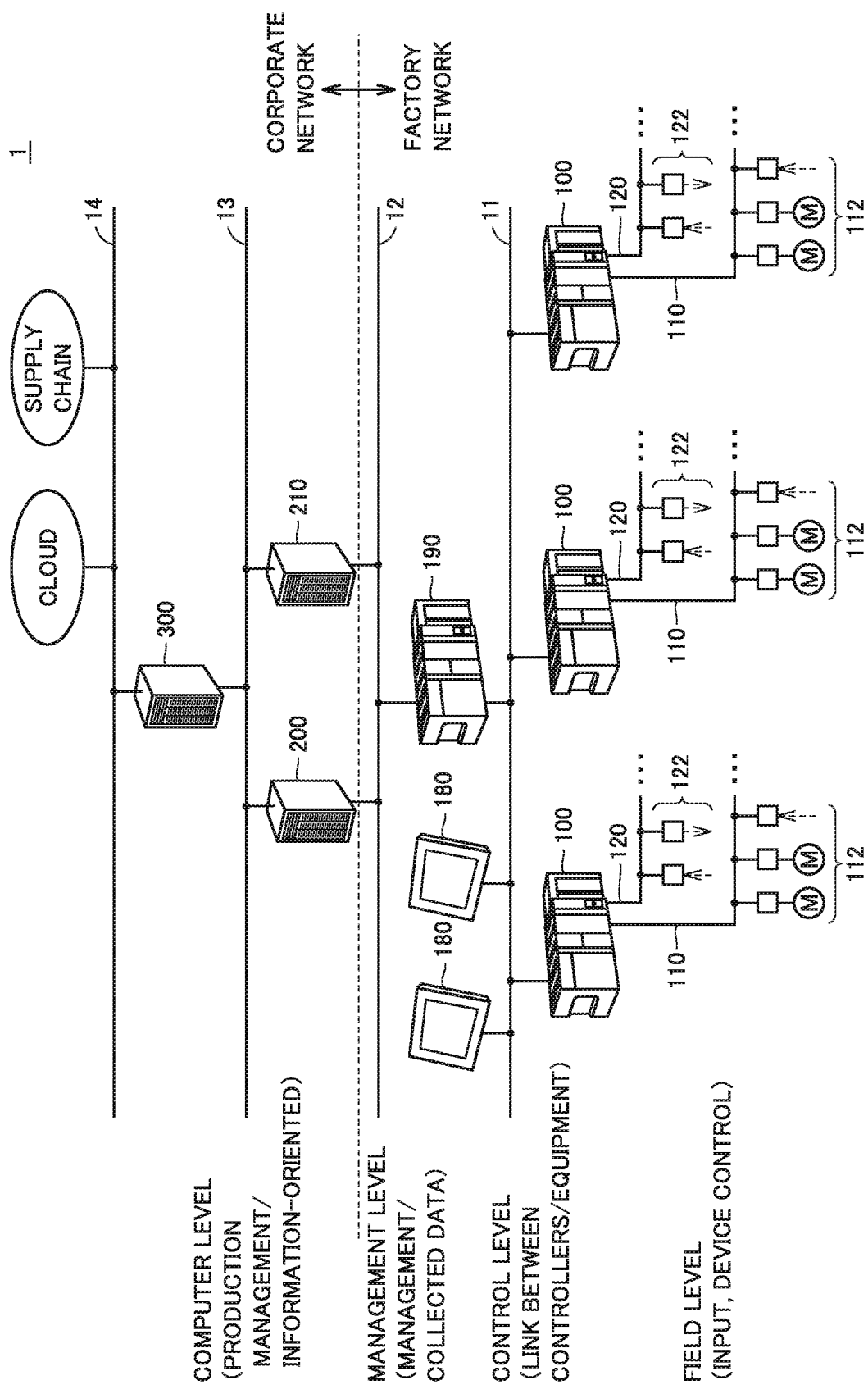
FIG. 1 is a schematic diagram showing one example of an overall configuration of a networked system according to the present embodiment.

An embodiment of the present invention will be described in detail with reference to the drawings. The same or corresponding elements in the drawings have the same reference characters allotted and description thereof will not be repeated.

<A. Overall Configuration of Networked System>

An overall configuration of a networked system in which communication processing according to the present embodiment is adopted will initially be described. FIG. 1 is a schematic diagram showing one example of an overall configuration of a networked system 1 according to the present embodiment.

Referring to FIG. 1, in networked system 1, networks are connected to a plurality of levels and a different function is allocated to a network at each level. Specifically, four levels of networks 11 to 14 are provided.

Network 11 is a control-level network to which a control device 100 representing machine control equipment, an apparatus/line management apparatus 190 representing apparatus/line management equipment, and a display 180 which provides a supervisory control and data acquisition (SCADA) function are connected, so that a link allowing exchange of data between apparatuses is formed. Network 11 constructs a data link between a controller (control device 100) and management equipment (apparatus/line management apparatus 190 and display 180).

Various devices such as a sensor and an actuator are connected to control device 100. These devices may directly be connected with an input and output unit attached to control device 100 being interposed, or may be connected over a field network. In the configuration example shown in FIG. 1, field networks 110 and 120 are connected to control device 100 and device groups 112 and 122 are connected to respective field networks. The device group includes an input device which obtains a field signal and an output device or an actuator which performs some kind of action onto a field in response to an instruction from control device 100. Therefore, a field network at a field level is further added to networked system 1 shown in FIG. 1, in addition to the four levels of networks 11 to 14. The field level provides input and device control as its main function.

Network 12 is a management-level network to which apparatus/line management apparatus 190 and display 180 as well as a manufacturing management apparatus 200 and a database apparatus 210 are connected, so that a link allowing exchange of data between apparatuses is formed. Network 12 provides exchange of management information and transmission of information on an apparatus/a line as its main function.

Network 13 is a computer-level network to which manufacturing management apparatus 200 and database apparatus 210 as well as a production management apparatus 300 which manages a production schedule are connected, so that a link allowing exchange of data between apparatuses is formed. Network 13 provides transmission of data about production management and information-oriented data as its main function.

Network 14 is an external network such as the Internet to which production management apparatus 300 and a cloud or a supply chain are connected.

In networked system 1 shown in FIG. 1, network 12 and a network at a level equal to or lower than that are also referred to as a "factory network" and provide control-oriented communication for exchanging data for actually controlling equipment (which may also collectively be referred to as "control-oriented data" below). A network at a level equal to or higher than network 13 is also referred to as a "corporate network" and provides information-oriented communication for exchanging data for monitoring, managing, and controlling production activities in a production line/a factory (which may also collectively be referred to as "information-oriented data" below).

A protocol and a framework in accordance with a difference in required characteristics are adopted for networks 11 to 14 and field networks 110 and 120. For example, EtherNet/IP™ representing such an industrial open network that a control protocol is implemented on general-purpose Ethernet™ may be employed as a protocol for networks 11 and 12 and field network 120 belonging to the factory network. EtherCAT® representing one example of a machine control network may be adopted for field network 110.

By adopting such a network technology suitable for machine control, such a real-time ability that a time period required for transmission between pieces of equipment is guaranteed can be provided. An amount of data which can be transmitted in one communication cycle, however, is restricted.

General-purpose Ethernet® or the like is employed as a protocol for networks 13 and 14 belonging to the corporate network in order to ensure diversity of connection destinations. By adopting general-purpose Ethernet®, restriction such as an amount of data which can be transmitted is not imposed, although the real-time ability cannot be realized.

<B. Required Communication Capability>

In the factory network shown in FIG. 1, control-oriented data as described above is basically cyclically transmitted, however, information-oriented data required by manufacturing management apparatus 200, database apparatus 210, and production management apparatus 300 included in the corporate network should also be transmitted. In the description below, all or at least one of apparatuses included in the corporate network are/is also collectively referred to as a "higher-order management system" in comparison to the factory network.

Furthermore, there is also data which requires guaranteed arrival time to some extent (for example, data on setting and management of equipment) although it is not required to have a high real-time ability as in the case of control-oriented data. For the sake of convenience of description, such data is also referred to as "control information-oriented data" below.

FIG. 2 is a diagram showing a type of data transmitted over networked system 1 in FIG. 1, Referring to FIG. 2, in networked system 1, mainly (1) control-oriented data, (2) control information-oriented data, and (3) information-oriented data are transmitted. Exclusion of transmission of data categorized into none of them is not intended, and yet another type of data may be transmitted.

(1) Control-oriented data mainly includes data for actually controlling equipment. The control-oriented data corresponds to data to be used for control of a manufacturing apparatus or a production facility. Examples of the control-oriented data include a servo command value, an encoder value, and a sensor ON/OFF value. A communication cycle of such control-oriented data is preferably set to 10 msec. or shorter. This communication cycle should reliably be guaranteed. Since contents of the control-oriented data transmitted over the network are set in advance, a data size is fixed and relatively small.

(2) Control information-oriented data is categorized into information necessary for control among data used in information-oriented communication, and it mainly includes data on setting and management of equipment. The control information-oriented data corresponds to data of which delivery to a destination within a designated time period is required. Examples of the control information-oriented data include firmware for setting of various parameters such as a threshold value for a sensor device, collection of information on a fault condition (log) stored in each piece of equipment, and update of each piece of equipment. Though contents of control information-oriented data transmitted over such a network are various, the data is basically data on setting and management of equipment and hence approximately several kbytes are assumed as a data size. Therefore, a communication cycle of control information-oriented data is preferably set to be shorter than 100 msec. Though a communication cycle may relatively be long, a time of arrival of data should be guaranteed. A user may designate any arrival time, or an application or an apparatus which generates or requests data may designate arrival time under a predetermined rule.

(3) Information-oriented data is categorized into information necessary for a higher-order management system among data used in information-oriented communication, and it mainly includes data to be used by the higher-order management system. Examples of the information-oriented data include statistical data such as information collected by a sensor for a certain period and a surveillance image (a still image/a moving image) picked up under some conditions. Contents of information-oriented data transmitted over such a network are various and data sizes are also various. Typically, a data size of information-oriented data is assumed to be larger than a data size of control information-oriented data. Since information-oriented data is not directly relevant to control of equipment, it is assumed that the information-oriented data is transmitted under the best effort scheme. In this case, importance is placed on magnitude of throughput rather than on the real-time ability (that is, arrival of data at designated time).

Categorization into any of the control-oriented data, the control information-oriented data, and the information-oriented data may uniquely be determined for each piece of data, or even the same data may variably be categorized into any of the control-oriented data, the control information-oriented data, and the information-oriented data depending on an application thereof. In the latter case, typically, categorization into some type is determined depending on how each piece of data is used in a layer of interest. Such categorization may be set in advance for each piece of data.

Thus, control-oriented data requires communication at a high speed and high accuracy, whereas information-oriented data requires communication of a large capacity. Control information-oriented data requires a characteristic intermediate between the control-oriented data and the information-oriented data.

Communication processing according to the present embodiment provides a configuration and processing for data transmission while three different types of requirements are each met. Communication processing according to the present embodiment implements communication in which three types of data different in required characteristic are integrated over a single network.

More specifically, a function of dynamic scheduling to store three types of data in packets as appropriate while a predetermined system cycle is maintained is provided.

<C. Hardware Configuration>

A communication apparatus according to the present embodiment is connected to a network over which data is updated every predetermined cycle. Then, the communication apparatus according to the present embodiment properly schedules each of control-oriented data, control information-oriented data, and information-oriented data. The communication apparatus according to the present embodiment is not particularly limited in its form of implementation so long as it is arranged on a path over which these three types of data are transmitted.

An exemplary implementation as a part of a communication function of control device 100 connected to network 11 is assumed and described below. Without being limited to control device 100, for example, a communication apparatus may be implemented as a part of a communication function involved with apparatus/line management apparatus 190 or display 180 connected to network 11 or as a part of a communication function involved with a remote input and output apparatus for networking various types of equipment on a field.

Figure 3:
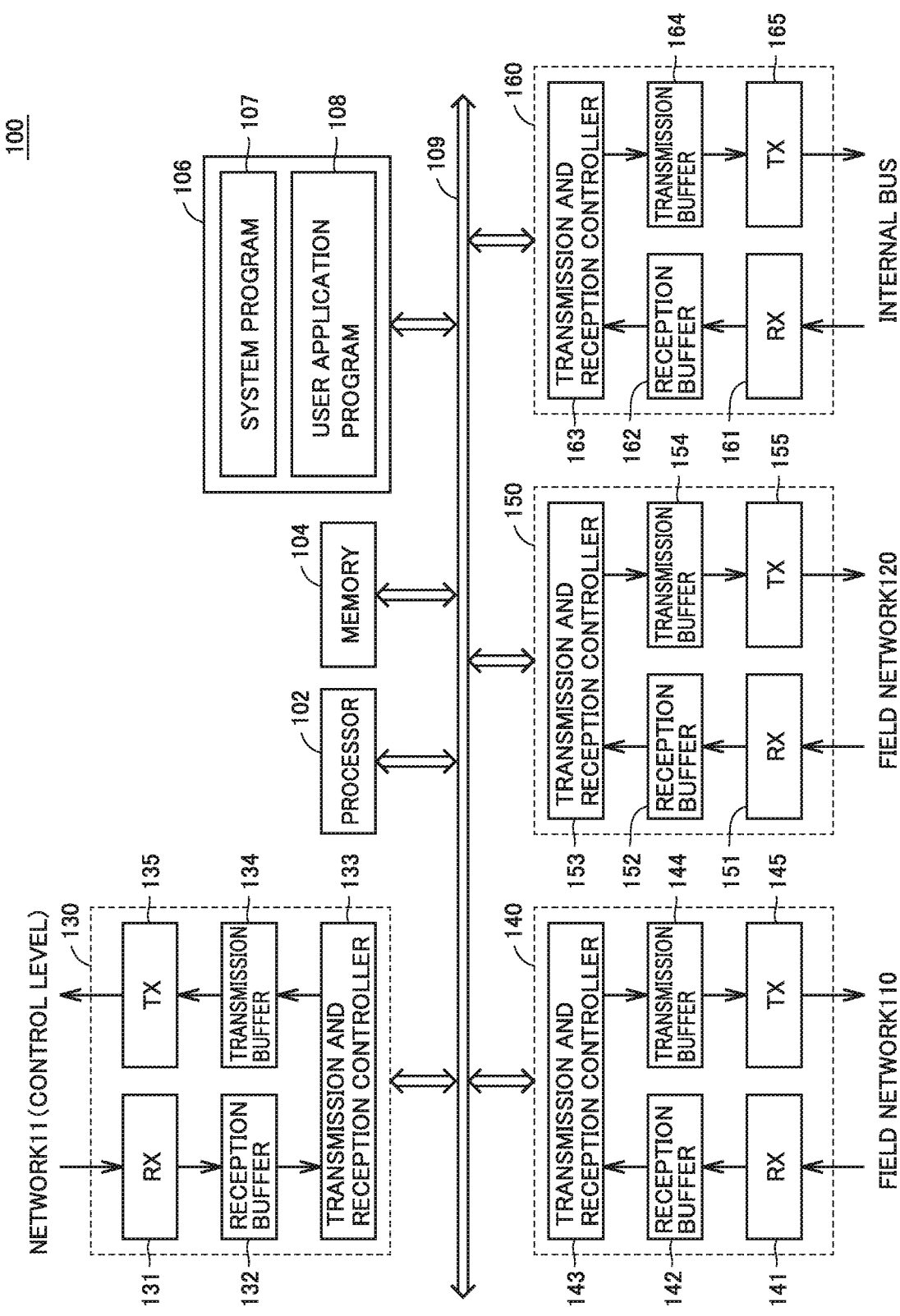
FIG. 3 is a schematic diagram showing one example of a hardware configuration of a control device including a communication apparatus according to the present embodiment.

FIG. 3 is a schematic diagram showing one example of a hardware configuration of control device 100 including the communication apparatus according to the present embodiment. Control device 100 may typically be configured based on a PLC. Referring to FIG. 3, control device 100 includes as its main components, a processor 102, a memory 104, a storage 106, a network controller 130, field network controllers 140 and 150, and an internal bus controller 160.

Processor 102 performs various types of processing including processing as will be described later, by reading a system program 107 and a user application program 108 stored in storage 106 to memory 104 and executing the same. Memory 104 is implemented by a volatile storage device such as a dynamic random access memory (DRAM) or a static random access memory (SRAM). Storage 106 is implemented by a non-volatile storage device such as a hard disk or a flash memory. Storage 106 stores user application program 108 designed in accordance with an object to be controlled, in addition to system program 107 for control of each part of control device 100.

Network controller 130 provides an interface for control device 100 to exchange data with another apparatus over network 11. Network controller 130 includes as its main components, a reception circuit (RX) 131, a reception buffer 132, a transmission and reception controller 133, a transmission buffer 134, and a transmission circuit (TX) 135.

Reception circuit 131 receives a packet transmitted in constant cycles over network controller 130 and writes data stored in the received packet into reception buffer 132. Transmission and reception controller 133 successively reads received packets written in reception buffer 132 and outputs only data necessary for processing in control device 100 among read data to processor 102. Transmission and reception controller 133 successively writes data or packets to be transmitted to another apparatus into transmission buffer 134 in response to a command from processor 102. Transmission circuit 135 successively sends data stored in transmission buffer 134 in accordance with cycles of transfer of packets over network controller 130.

Field network controller 140 provides an interface for control device 100 to exchange data with various devices (device group 112 shown in FIG. 1) over field network 110. Field network controller 140 includes as its main components, a reception circuit (RX) 141, a reception buffer 142, a transmission and reception controller 143, a transmission buffer 144, and a transmission circuit (TX) 145. Since functions of these components are the same as those of corresponding components in network controller 130, detailed description will not be repeated.

Similarly, field network controller 150 provides an interface for control device 100 to exchange data with various devices (device group 122 shown in FIG. 1) over field network 120. Field network controller 150 includes as its main components, a reception circuit (RX) 151, a reception buffer 152, a transmission and reception controller 153, a transmission buffer 154, and a transmission circuit (TX) 155. Since functions of these components are the same as those of corresponding components in network controller 130 and field network controller 140, detailed description will not be repeated.

Internal bus controller 160 provides an interface for exchanging data through an internal bus (not shown) with an input and output unit attached to control device 100. Internal bus controller 160 includes as its main components, a reception circuit (RX) 161, a reception buffer 162, a transmission and reception controller 163, a transmission buffer 164, and a transmission circuit (TX) 165. Since functions of these components are the same as those of corresponding components in network controller 130, detailed description will not be repeated.

<D. Software Configuration>

Figure 4:
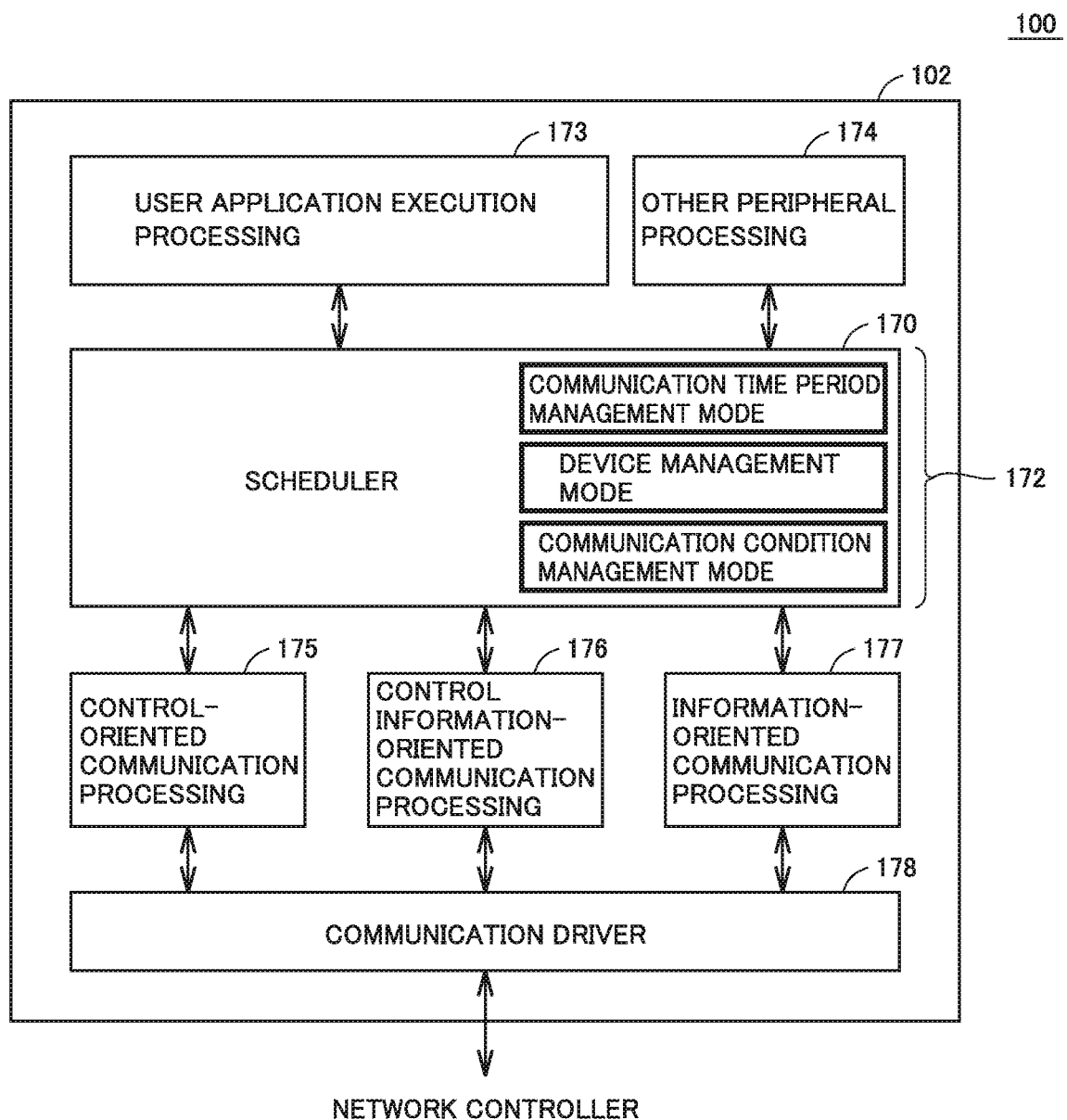
FIG. 4 is a schematic diagram showing one example of a software configuration of the control device for performing communication processing according to the present embodiment.

One example of a software configuration for performing communication processing (dynamic scheduling) according to the present embodiment will now be described. FIG. 4 is a schematic diagram showing one example of a software configuration of control device 100 for performing communication processing according to the present embodiment.

Referring to FIG. 4, a scheduler 170 is executed in processor 102 of control device 100. Scheduler 170 determines an order of execution or suspension of execution of a plurality of types of processing in accordance with a predetermined system cycle. More specifically, scheduler 170 allocates processing resources (a processor time resource and a memory) in accordance with predetermined priority and system cycle to user application execution processing 173, peripheral processing 174 including various types of processing, control-oriented communication processing 175, control information-oriented communication processing 176, and information-oriented communication processing 177.

User application execution processing 173 includes processing involved with execution of user application program 108.

Control-oriented communication processing 175 includes processing involved with control-oriented data such as creation, encoding, decoding, extraction, and processing and edition of data. Similarly, control information-oriented communication processing 176 includes processing involved with control information-oriented data, and information-oriented communication processing 177 includes processing involved with information-oriented data.

A communication driver 178 is mounted on processor 102 of control device 100 and it controls network controller 130 (see FIG. 3) and the like.

Scheduler 170 dynamically schedules three types of data (control-oriented data, control information-oriented data, and information-oriented data) to fulfill required characteristics different from one another. Typically, three management modes 172 of a communication time period management mode, a device management mode, and a communication condition management mode are prepared for dynamic scheduling. All of these three management modes do not have to be implemented but only a necessary management mode may be implemented in consideration of overall processing in networked system 1 including control device 100. In addition to or instead of three management modes 172, a management mode other than three management modes 172 may be adopted.

<E: Dynamic Scheduling>

Communication processing (dynamic scheduling) according to the present embodiment includes an approach for dynamic optimization depending on characteristics of required data and various conditions. More specifically, dynamic scheduling according to the present embodiment is applied to a network over which data is updated every predetermined cycle, and while highest priority is basically placed on control-oriented communication, maximum use of a remaining communication band is made in another type of communication.

The "communication band" herein means a resource for transmitting data over a network, and when data is transmitted in time division, it means a time frame allocated for transmission of data. Alternatively, when data is transmitted in frequency division or code division, the communication band means a frequency or a code sequence (a logical channel) allocated to transmission of data. Dynamic scheduling according to the present embodiment is directed to how a necessary communication band is allocated to each piece of data under the restrictions of a finite communication band of a network of interest.

Any form can be adopted for implementation of dynamic scheduling according to the present embodiment. For example, in a configuration constituted of a host which manages a network and one client or a plurality of clients which perform(s) communication processing in accordance with an instruction from the host, dynamic scheduling according to the present embodiment may be implemented on the host. Alternatively, a partial function thereof may be implemented on a client and dynamic scheduling according to the present embodiment may be implemented by the entire network. Dynamic scheduling may be implemented also on a network constituted of a master and one slave or a plurality of slaves based on a similar method.

Dynamic scheduling according to the present embodiment can be implemented as appropriate as being integrated or distributed, depending on a configuration or a function of a network of interest.

Some specific examples of communication processing (dynamic scheduling) according to the present embodiment will be shown below. Specific processing in dynamic scheduling will be exemplified from a point of view of the three management modes shown in FIG. 4 ((1) the communication time period management mode, (2) the device management mode, and (3) the communication condition management mode).

(1) The communication time period management mode is scheduling mainly in consideration of priority of each type of communication processing. (2) The device management mode is scheduling mainly in consideration of a state of a communication destination device. (3) The communication condition management mode is scheduling mainly in consideration of a communication environment.

(e1. Communication Time Period Management Mode)

The communication time period management mode will initially be described. The communication time period management mode mainly aims to place highest priority on control-oriented communication and make maximum use of a remaining communication band.

Figure 5:
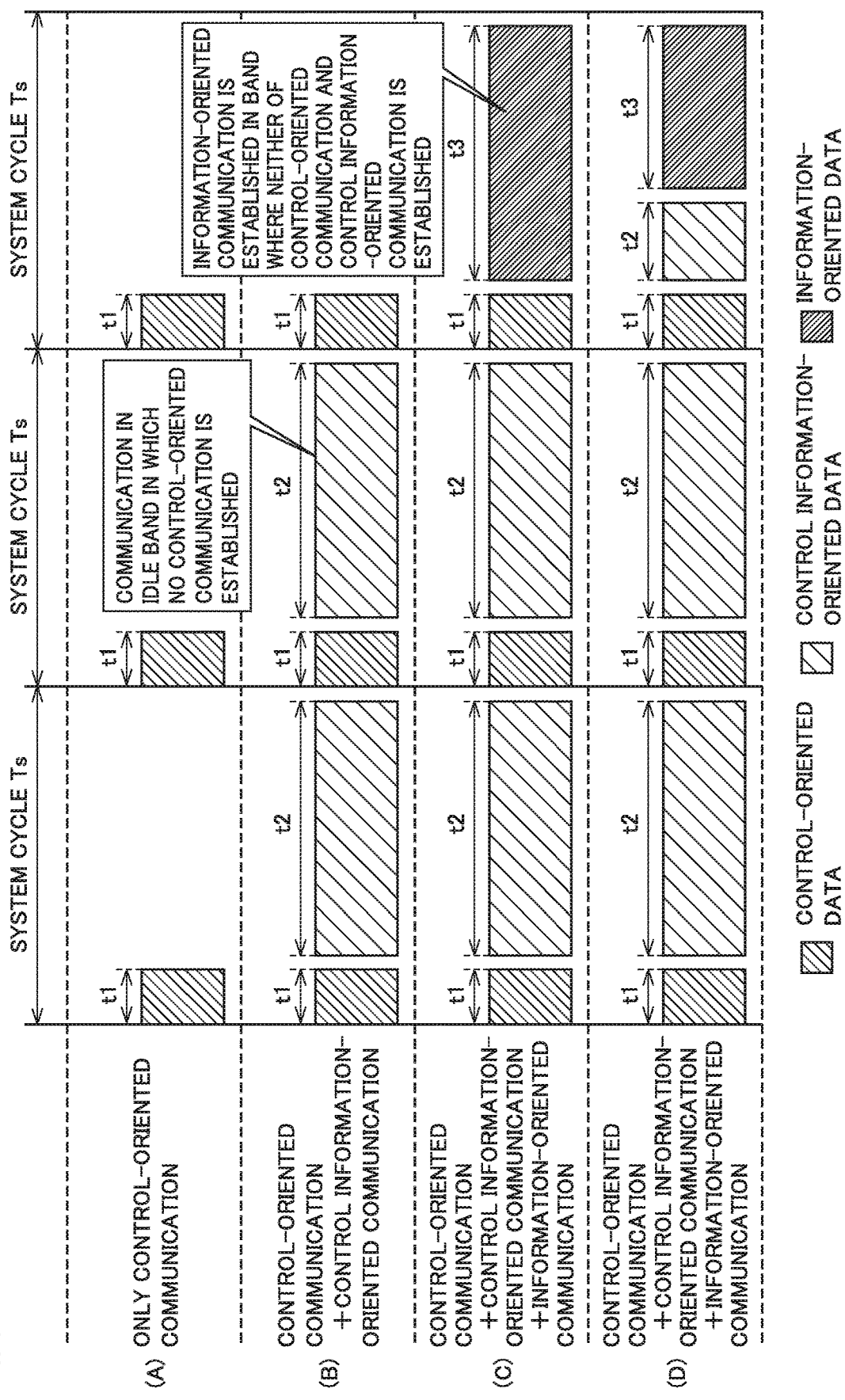
FIG. 5 is a schematic diagram for illustrating processing in a communication time period management mode in communication processing according to the present embodiment.

FIG. 5 is a schematic diagram for illustrating processing in the communication time period management mode in communication processing according to the present embodiment. Referring to FIG. 5, in communication processing according to the present embodiment, transmission and reception of control-oriented data, control information-oriented data, and information-oriented data (which are denoted as control-oriented communication, control information-oriented communication, and information-oriented communication, respectively) are scheduled in accordance with a predetermined system cycle Ts.

In the communication time period management mode, initially, control-oriented communication is preferentially allocated. As shown in FIG. 5(A), a processing time period t1 required fix control-oriented communication is first allocated to system cycle Ts. As shown in FIG. 5(B), control information-oriented communication is established as necessary in an idle band in which control-oriented communication is not established. A processing time period t2 required for control information-oriented communication is allocated to a remaining time period of system cycle Ts exclusive of processing time period t1 required for control-oriented communication.

Since control information-oriented communication does not occur in all system cycles, a processing time period t3 required for information-oriented communication may be allocated to a remaining time period of system cycle is exclusive of processing time period t1 required for control-oriented communication as shown in FIG. 5(C). Information-oriented communication is established in a communication band in which neither of control-oriented communication and control information-oriented communication is established.

As shown in FIG. 5(D), all of processing time period t1 required for control-oriented communication, processing time period t2 required for control information-oriented communication, and processing time period t3 required for information-oriented communication may be allocated to system cycle Ts.

Figure 6:
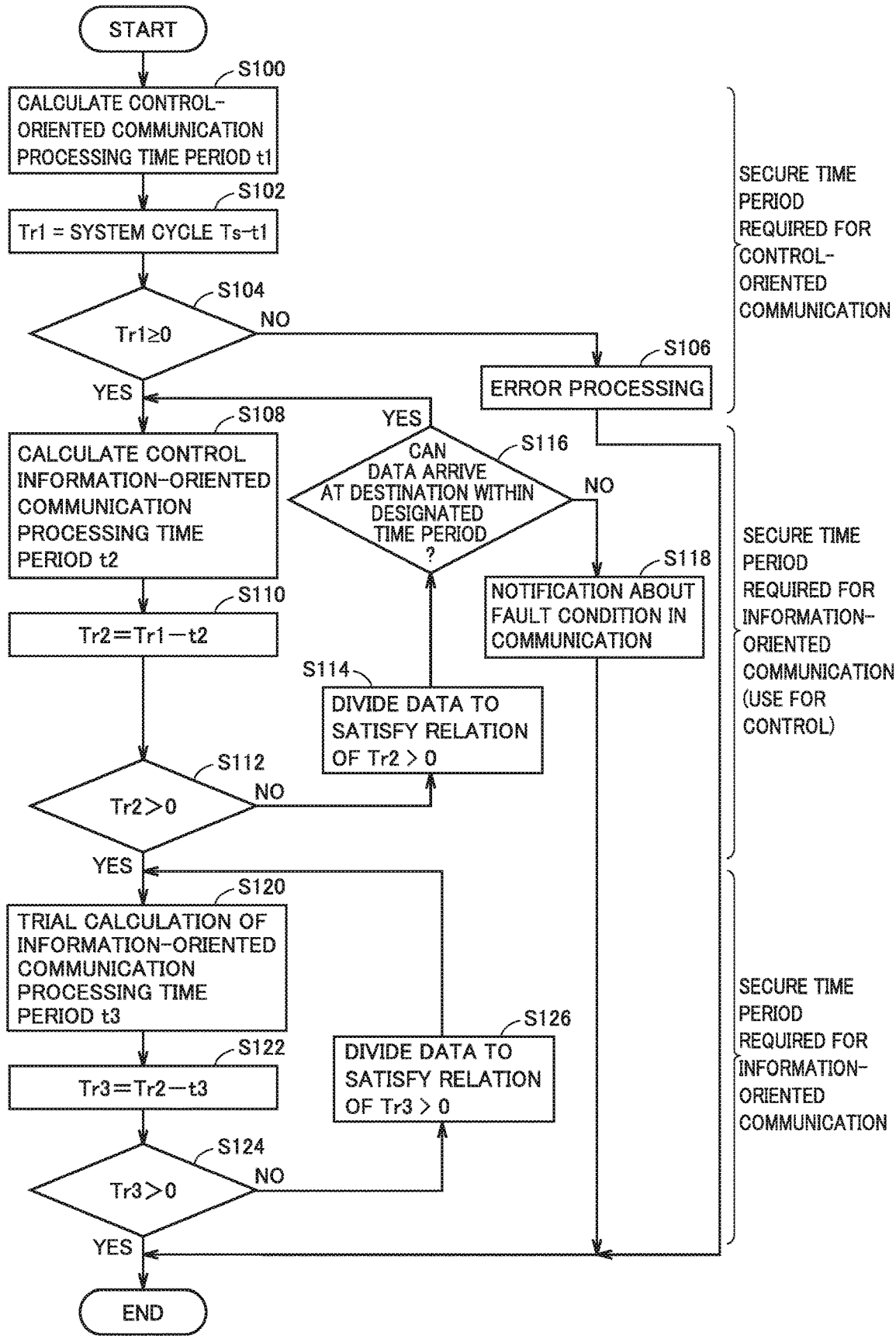
FIG. 6 is a flowchart showing a processing procedure in the communication time period management mode in communication processing according to the present embodiment.

FIG. 6 is a flowchart showing a processing procedure in the communication time period management mode in communication processing according to the present embodiment. The processing procedure shown in FIG. 6 is typically repeatedly performed every system cycle by processor 102 (FIG. 3) of control device 100.

Referring to FIG. 6, control device 100 calculates processing time period t1 required for control-oriented communication (step S100) and calculates a remaining time period Tr1 by subtracting calculated processing time period t1 from system cycle Ts (step S102). Remaining time period Tr1 having a negative value (NO in step S104) means that processing time period t1 required for control-oriented communication exceeds system cycle Ts, and hence control device 100 performs error processing (step S106) and the process in the system cycle ends.

Processing in steps S100 to S106 corresponds to scheduling processing for securing a first communication band necessary for updating every predetermined cycle, control-oriented data (first data) used for control of a manufacturing apparatus or a production facility. In these steps, time required for control-oriented communication is secured.

When remaining time period Tr1 is equal to or longer than zero (YES in step S104), control device 100 calculates processing time period t2 required for control information-oriented communication (step S108) and calculates a remaining time period Tr2 by subtracting processing time period t2 from remaining time period Tr1 calculated in step S102 (step S110). Remaining time period Tr2 having a negative value (NO in step S112) means that no control information-oriented communication of interest can be added within system cycle Ts, and hence control device 100 divides control information-oriented data to be communicated such that remaining time period Tr2 is longer than zero (step S114). In scheduling of control information-oriented data, control information-oriented data of interest is divided into pieces of data each having a data size in accordance with a communication band available in each system cycle and then divided pieces of data are allocated to a plurality of system cycles.

Whether or not control information-oriented data of interest can be delivered to a destination within a designated time period is determined based on the number of pieces of divided data of control information-oriented data to be communicated (that is, the number of required system cycles) (step S116). When the control information-oriented data of interest can reach the destination within the designated time period (YES in step S116), processing in step S108 and subsequent steps is repeated. Divided pieces of data are again allocated to next and subsequent system cycles.

In contrast, when the control information-oriented data of interest cannot be delivered to the destination within the designated time period (NO in step S116), a notification about a fault condition in communication is given (step S118). Time of arrival of control information-oriented data may be designated in advance by a user or an application.

For giving a notification about a fault condition in communication, a method of turning on a system flag may be employed or a method of turning on an indicator located on a display surface of control device 100 may be adopted. Thus, when a designated time (time of arrival) of control information-oriented data cannot be guaranteed by division of control information-oriented data, a notification about a fault condition in communication may be given by a proper method. Upon receiving such a notification about a fault condition in communication, a user can take such measures as relaxing a requirement for designated time (time of arrival) or reducing an amount of application processing on a device side. Thus, steps S116 and S118 correspond to processing for giving a notification about a fault condition when control information-oriented data cannot be delivered to a destination within a designated time period by division of control information-oriented data.

Processing in steps S108 to S118 described above corresponds to scheduling processing for securing a communication band necessary for delivering control information-oriented data (second data) to a destination within a designated time period in a communication band other than the communication band for control-oriented data of communication bands of the network. In these steps, time required for control information-oriented communication is secured. When there is no control information-oriented data to be communicated, steps S108 to S118 may be skipped.

When remaining time period Tr2 is longer than zero (YES in step S112), control device 100 calculates processing time period t3 required for information-oriented communication (step S120) and calculates a remaining time period Tr3 by subtracting processing time period t3 from remaining time period Tr2 calculated in step S110 (step S122). Remaining time period Tr3 having a negative value (NO in step S124) means that no information-oriented communication of interest can be added within system cycle Ts, and hence control device 100 divides information-oriented data to be communicated such that remaining time period Tr3 is longer than zero (step S126). Divided pieces of data are again allocated to next and subsequent system cycles.

Processing in steps S120 to S126 corresponds to scheduling processing for securing a communication band for transmitting information-oriented data (third data) in a communication band set as neither of the communication band for control-oriented data and the communication band for control information-oriented data of the communication bands of the network. These steps correspond to processing for securing time required for information-oriented communication. When there is no information-oriented data to be communicated, steps S120 to S126 may be skipped.

Dynamic scheduling in the communication time period management mode is implemented by repeatedly performing the processing procedure as above every system cycle.

The processing procedure shown in FIG. 6 assumes a state that there is a margin until designated time (time of arrival) in control information-oriented communication, information-oriented communication has not been established for a certain period of time or longer, and yet-to-be-transmitted frames are accumulated. In this case, three types of control-oriented data, control information-oriented data, and information-oriented data can be transmitted or received in an identical system cycle. When it is determined that designated time (time of arrival) for control information-oriented communication cannot be guaranteed based on a condition of a line at the time of establishment of information-oriented communication, information-oriented communication does not have to be established. Information-oriented communication may be established only when any margin in time is available based on a condition of a line or the like.

An exception in which information-oriented data is prioritized over control information-oriented data may further be provided. For example, when such a state that information-oriented communication had not been established for a certain period of time or longer and yet-to-be-transmitted frames had been accumulated has continued for a longer period of time and there is any margin in control information-oriented communication, information-oriented communication may be prioritized so long as time of arrival of control information-oriented communication is guaranteed. Namely, a communication band necessary for information-oriented communication may first be allocated.

(e2. Device Management Mode (No. 1))

The device management mode (No. 1) will now be described. A main purpose of the device management mode (No. 1) is to optimize a data size/a communication cycle in accordance with a characteristic of a reception side device.

Figure 7:
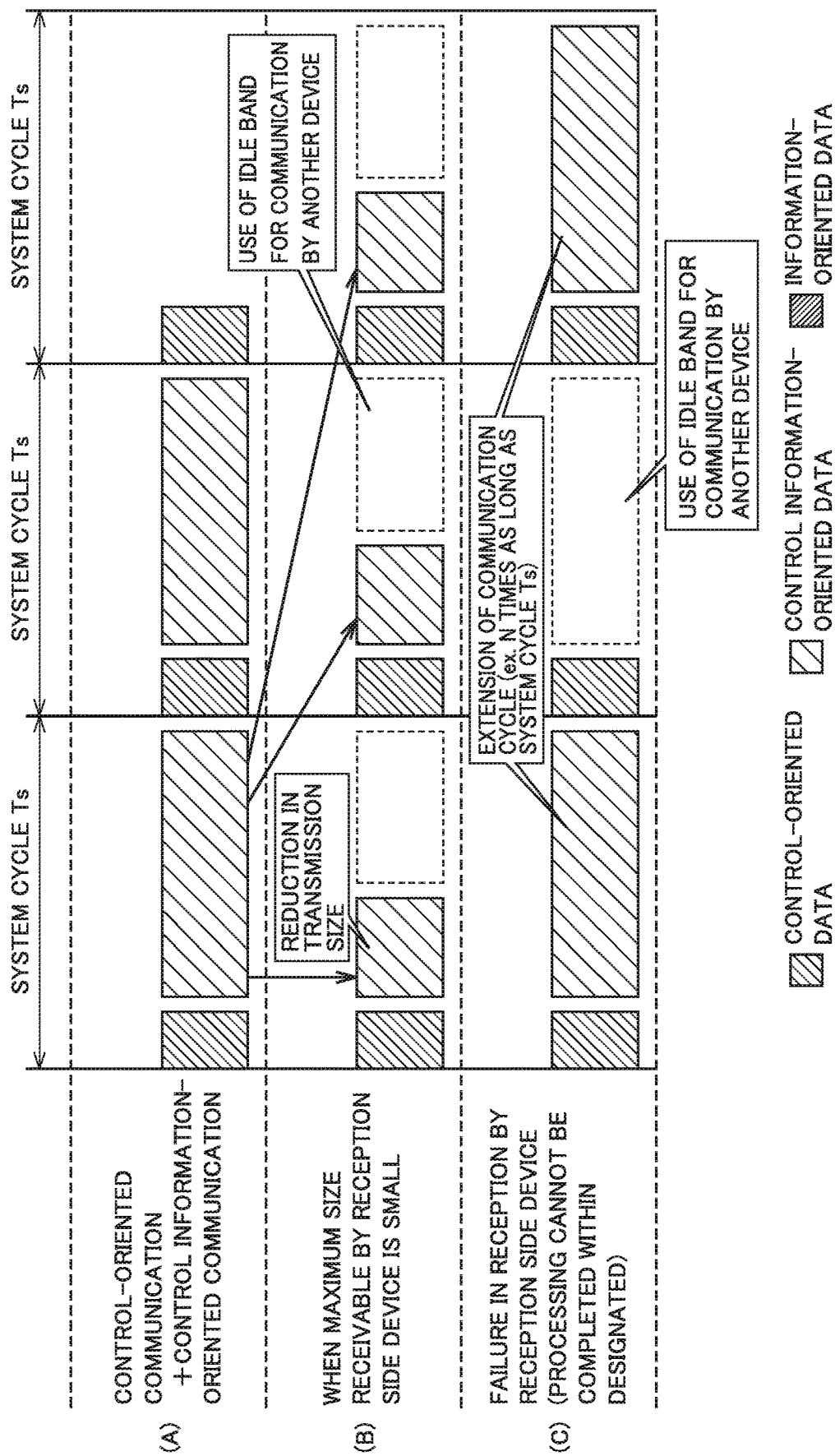
FIG. 7 is a schematic diagram for illustrating processing in a device management mode (No. 1) in communication processing according to the present embodiment.

FIG. 7 is a schematic diagram for illustrating processing in the device management mode (No. 1) in communication processing according to the present embodiment. FIG. 7 shows communication processing when control information-oriented data in addition to control-oriented data is transmitted to a specific device.

In the device management mode (No. 1) shown in FIG. 7 as well, basic scheduling in a communication band is the same as in the communication time period management mode described above. For example, as shown in FIG. 7(A), control information-oriented data for a specific device in addition to control-oriented data is transmitted in each system cycle. Therefore, detailed description of processing the same as in the communication time period management mode described above will not be repeated.

Since a reception buffer of a device which receives control information-oriented data is affected by performance specific to the device, a data size in one transmission may be restricted. In such a case, as shown in FIG. 7(B), in the device management mode (No. 1), a unit of transmission of a data size of control information-oriented data to be transmitted is made smaller. A data size of control information-oriented data in one transmission is made smaller and whole data is transmitted as being divided in a larger number of transmissions. Thus, when a maximum size receivable by the reception side device is small, a unit of transmission of a transmission size is made smaller. With the unit of transmission being made smaller, a communication band initially used for communication of control information-oriented data now becomes available and this available communication band may be made use of for communication of control information-oriented data for another device.

Figure 8:
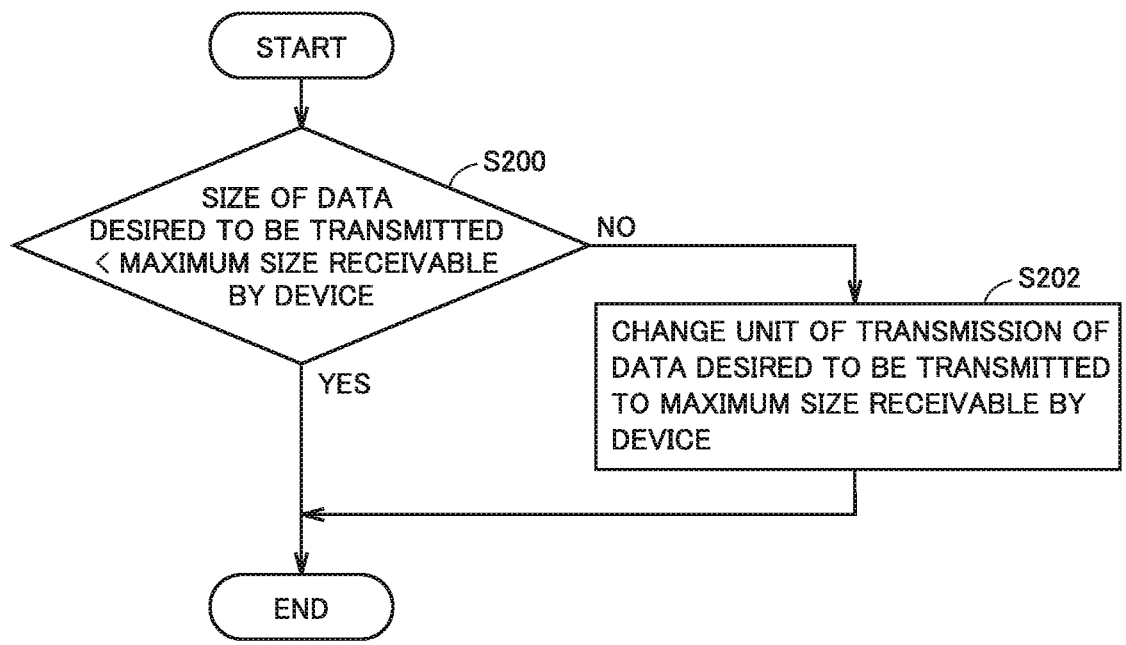
FIG. 8 is a flowchart showing a processing procedure (at the time of initial startup) in the device management mode (No. 1) in communication processing according to the present embodiment.

FIG. 8 is a flowchart showing a processing procedure (at the time of initial startup) in the device management mode (No. 1) in communication processing according to the present embodiment. A processing procedure shown in FIG. 8 is typically performed at the time of initial startup of communication processing by processor 102 (FIG. 3) of control device 100. In this processing, a unit of transmission is changed in accordance with a maximum size receivable by a communication counterpart device.

Referring to FIG. 8, control device 100 determines whether or not a size of data to be transmitted is smaller than a maximum size receivable by a destination device (step S200). The maximum size receivable by a destination device may be determined based on setting prepared in advance or obtained by directly asking the destination device.

When a size of data to be transmitted exceeds the maximum size receivable by the destination device (NO in step S200), control device 100 changes a unit of transmission of data to be transmitted to a maximum size receivable by the destination device (step S202). When the size of data to be transmitted is smaller than the maximum size receivable by the destination device (YES in step S200), the unit of transmission is not changed.

Thus, in the device management mode (No. 1) of communication processing according to the present embodiment, control information-oriented data (second data) is divided in accordance with a data size receivable by a destination and then divided pieces of data are allocated to a plurality of system cycles.

Referring again to FIG. 7, processing capability of a device which receives control information-oriented data is low, and throughput which can be allowed for control information-oriented data may be restricted. In such a case, as shown in FIG. 7(C), in the device management mode (No. 1), a communication cycle of control information-oriented data is changed to be longer. Instead of transmission of control information-oriented data every system cycle, control information-oriented data may be transmitted in a communication cycle N times as long as the system cycle. Thus, when processing by the reception side device is not completed within a designated time period and consequently the reception side device is unable to receive the control information-oriented data, the communication cycle may be extended by such a method as setting communication cycle N times as long as system cycle Ts. By changing the communication cycle, a communication band initially used for communication of control information-oriented data now becomes available and this available communication band may be made use of for communication of control information-oriented data for another device.

Figure 9:
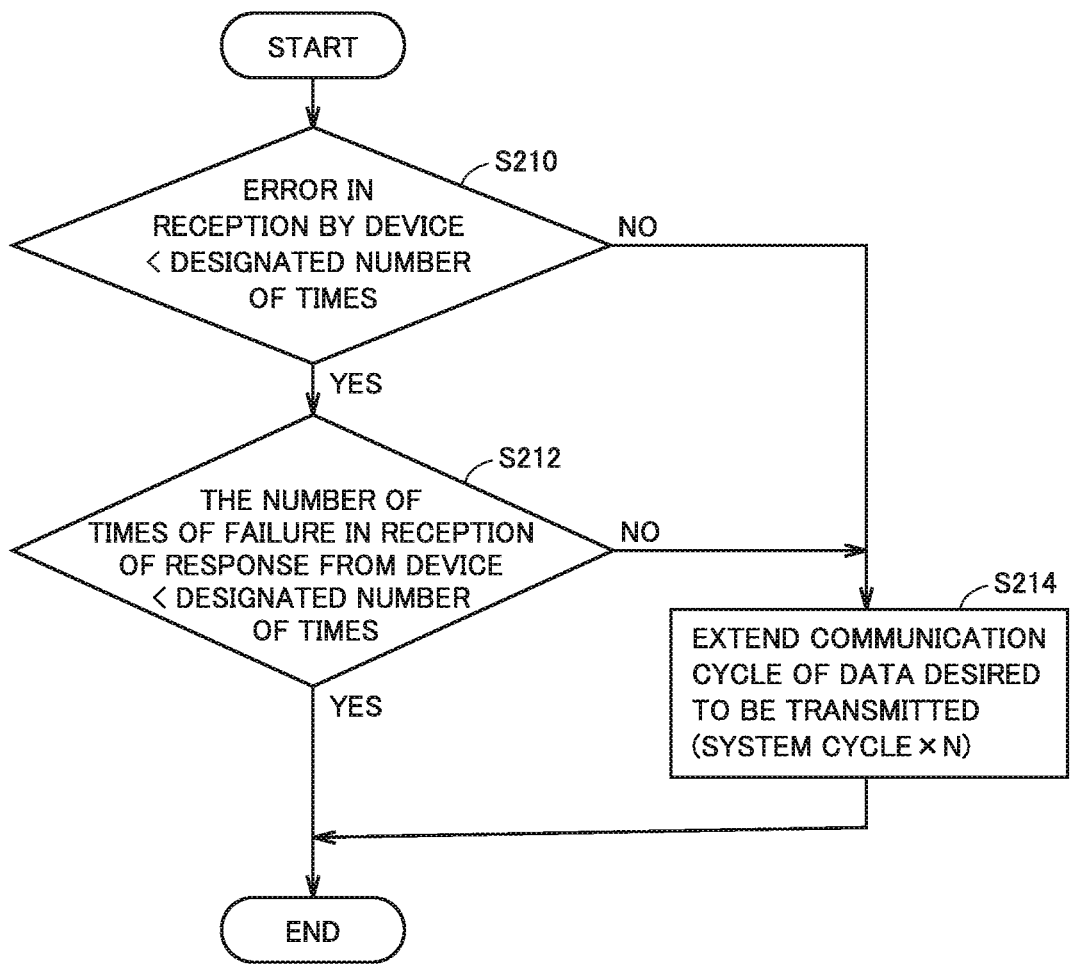
FIG. 9 is a flowchart showing a processing procedure (during communication processing) the device management mode (No. 1) in communication processing according to the present embodiment.

FIG. 9 is a flowchart showing a processing procedure (during communication processing) in the device management mode (No. 1) in communication processing according to the present embodiment. A processing procedure shown in FIG. 9 is typically performed by processor 102 (FIG. 3) of control device 100 as appropriate during communication processing. Specifically, the communication cycle is dynamically set in accordance with a time interval in which a communication counterpart device is capable of reception.

Referring to FIG. 9, control device 100 determines whether or not the number of times of reception errors in a device is smaller than a designated number of times (step S210). The number of times of reception errors in a destination device may be obtained from an entity which manages communication or determined based on a response message from the destination device. When the number of times of reception errors in the device has reached the designated number of times (NO in step S210), processing in step S214 is performed.

When the number of times of reception errors in the device is smaller than the designated number of times (YES in step S210), whether or not the number of times of failure in reception of a reception response from the device is smaller than a designated number of times is determined (step S212). When the number of times of failure in reception of a reception response from the device has reached the designated number of times (NO in step S212), processing in step S214 is performed.

When occurrence of some kind of error is detected in step S210 or S212, control device 100 extends a cycle of communication of data to be transmitted, by setting the communication cycle N times as long as the system cycle (step S214). When no error is detected in step S210 or S212, control device 100 continues communication under initial setting.

Thus, in the device management mode (No. 1) in communication processing according to the present embodiment, control information-oriented data (second data divided and then divided data is successively transmitted in cycles longer than the system cycle in accordance with a condition of processing of reception data at a destination. When reception processing in a destination device cannot appropriately be performed during communication processing, control device 100 substantially extends the communication cycle. Though the number of times of reception errors at a destination and the number of times of failure in reception of a reception response from the destination are given as examples of a method of determining a condition of processing of reception data at the destination, any information may be used without being limited as such.

As shown in FIG. 7 or 9, when designated time (time of arrival) of control information-oriented communication cannot be guaranteed by division of control information-oriented data or extension of the communication cycle, a notification about a fault condition in communication may be given by an appropriate method (as in step S118 in FIG. 6 described above). Upon receiving such a notification about a fault condition in communication, a user can take such measures as relaxation of a requirement for designated time (time of arrival) or reduction in amount of application processing on a device side. A notification about a fault condition in communication may similarly be given also when it is determined at the time of initial startup that data to be transmitted cannot be transmitted within a system cycle.

Furthermore, change in unit of transmission shown in FIG. 7(B) and extension of a communication cycle shown in FIG. 7(C) may be combined.

(e3. Device Management Mode (No. 2))

The device management mode (No. 2) will now be described. A main purpose of the device management mode (No. 2) is to optimize a data size/a communication cycle in accordance with a characteristic of a reception side device.

Figure 10:
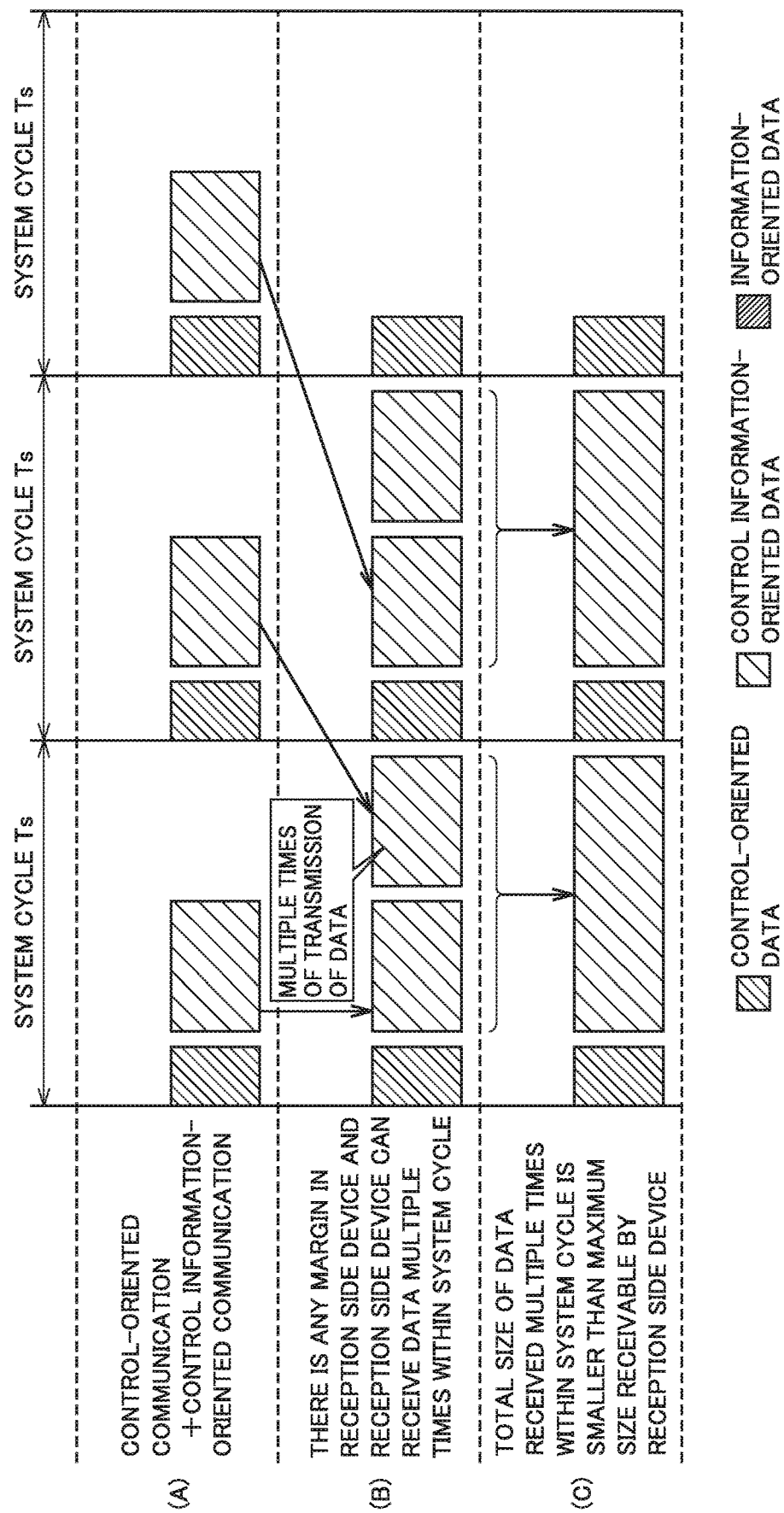
FIG. 10 is a schematic diagram for illustrating processing in the device management mode (No. 2) in communication processing according to the present embodiment.

FIG. 10 is a schematic diagram for illustrating processing in the device management mode (No. 2) in communication processing according to the present embodiment. FIG. 10 shows communication processing when control information-oriented data in addition to control-oriented data is transmitted to a specific device.

In the device management mode (No. 2) shown in FIG. 10 as well, basic scheduling in a communication band is the same as in the communication time period management mode described above. For example, as shown in FIG. 10(A), control information-oriented data for a specific device in addition to control-oriented data is transmitted in each system cycle. Therefore, detailed description of processing the same as in the communication time period management mode described above will not be repeated.

In contrast to the example in the device management mode (No. 1) described above, when a reception buffer of a device which receives control information-oriented data is large or when reception processing at a high speed can be performed, a plurality of pieces of control information-oriented data or information-oriented data for an identical device may be transmitted within an identical system cycle. When there is any margin in processing in a reception side device and a plurality of times of reception within a system cycle can be made, control information-oriented data or information-oriented data may be transmitted a plurality of times within a predetermined system cycle as shown in FIG. 10(B). In the device management mode (No. 2), a plurality of pieces of control information-oriented data or information-oriented data for an identical device may be transmitted within an identical system cycle.

With increase in number of times of transmission, time required for transmission of control information-oriented data or information-oriented data for a specific device can be shortened.

When a total size of data received a plurality of times within a system cycle in FIG. 10(B) is smaller than a maximum size receivable by a reception side device, data in a plurality of times of reception may be integrated and transmitted as one piece of larger data as shown in FIG. 10(C). Overhead can be reduced by making a unit of transmission of data larger.

Figure 11:
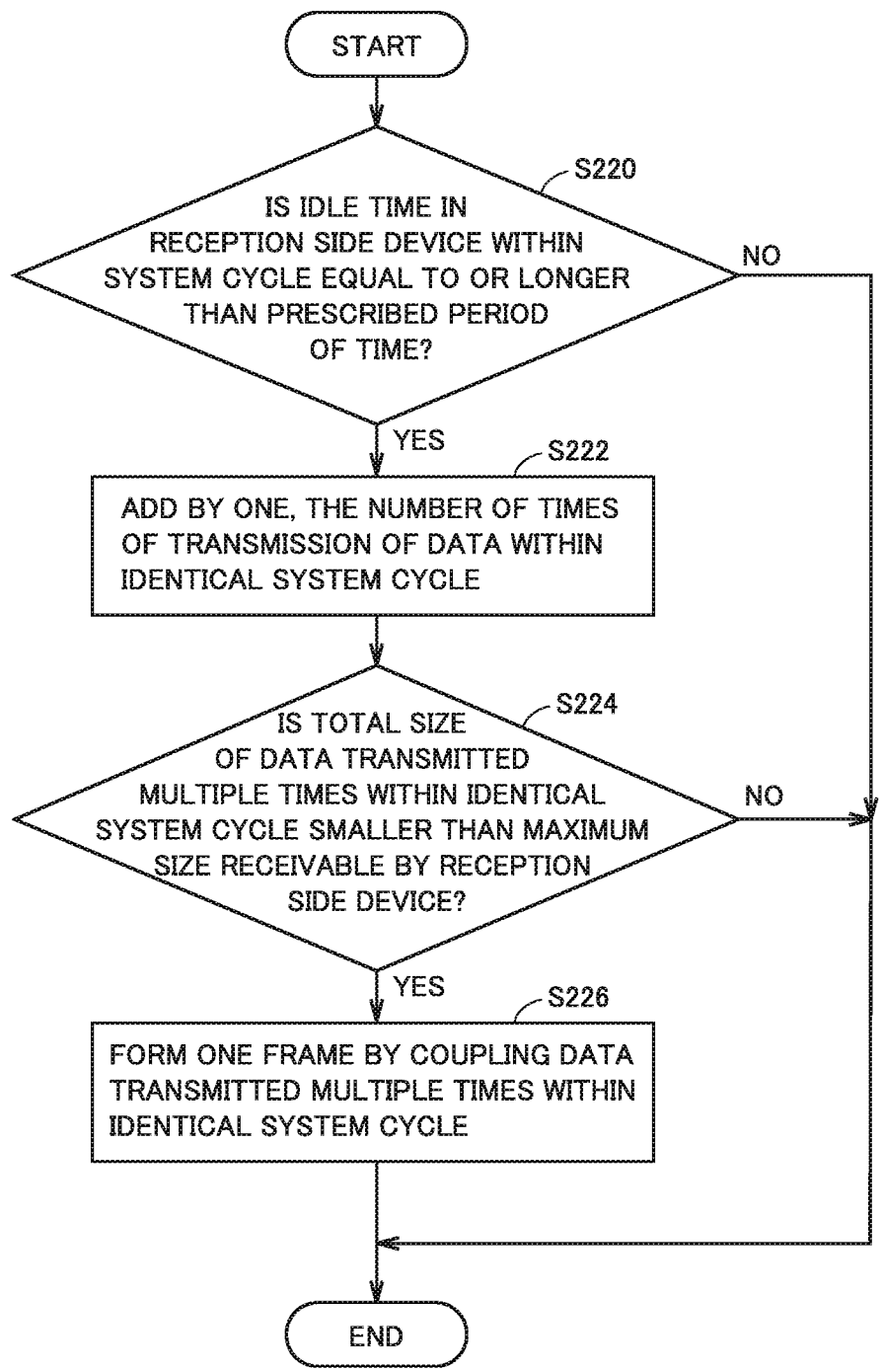
FIG. 11 is a flowchart showing a processing procedure (at the time of initial startup) in the device management mode (No. 2) in communication processing according to the present embodiment.

FIG. 11 is a flowchart showing a processing procedure (at the time of initial startup) in the device management mode (No. 2) in communication processing according to the present embodiment. A processing procedure shown in FIG. 11 is typically performed at the time of initial startup of communication processing by processor 102 (FIG. 3) of control device 100. In this processing, a unit of transmission is changed in accordance with a maximum size receivable by a communication counterpart device.

Referring to FIG. 11, control device 100 determines whether or not an idle time of a reception side device within a system cycle is equal to or longer than a prescribed period of time (step S220). When the idle time of the reception side device within the system cycle is equal to or longer than the prescribed period of time (YES in step S220), control device 100 adds by one the number of times of transmission of data within an identical system cycle (step S222). Then, control device 100 determines whether or not a total size of data transmitted a plurality of times within the identical system cycle is smaller than a maximum size receivable by a reception side device when data is transmitted in accordance with the number of times of transmission after addition in step S222 (step S224).

When the total size of data transmitted a plurality of times within the identical system cycle is smaller than the maximum size receivable by the reception side device (YES in step S224), control device 100 forms one frame by combining data transmitted a plurality of times within the identical system cycle (step S226).

When the idle time of the reception side device within the system cycle is shorter than the prescribed period of time (NO in step S220) or when the total size of data transmitted a plurality of times within the identical system cycle is larger than the maximum size receivable by the reception side device (NO in step S224), allocation of data to be transmitted in each system cycle is not changed.

(e4. Communication Condition Management Mode)

The communication condition management mode will now be described. A main purpose of the communication condition management mode is to dynamically optimize a data size in accordance with a state of a communication environment.

Figure 12:
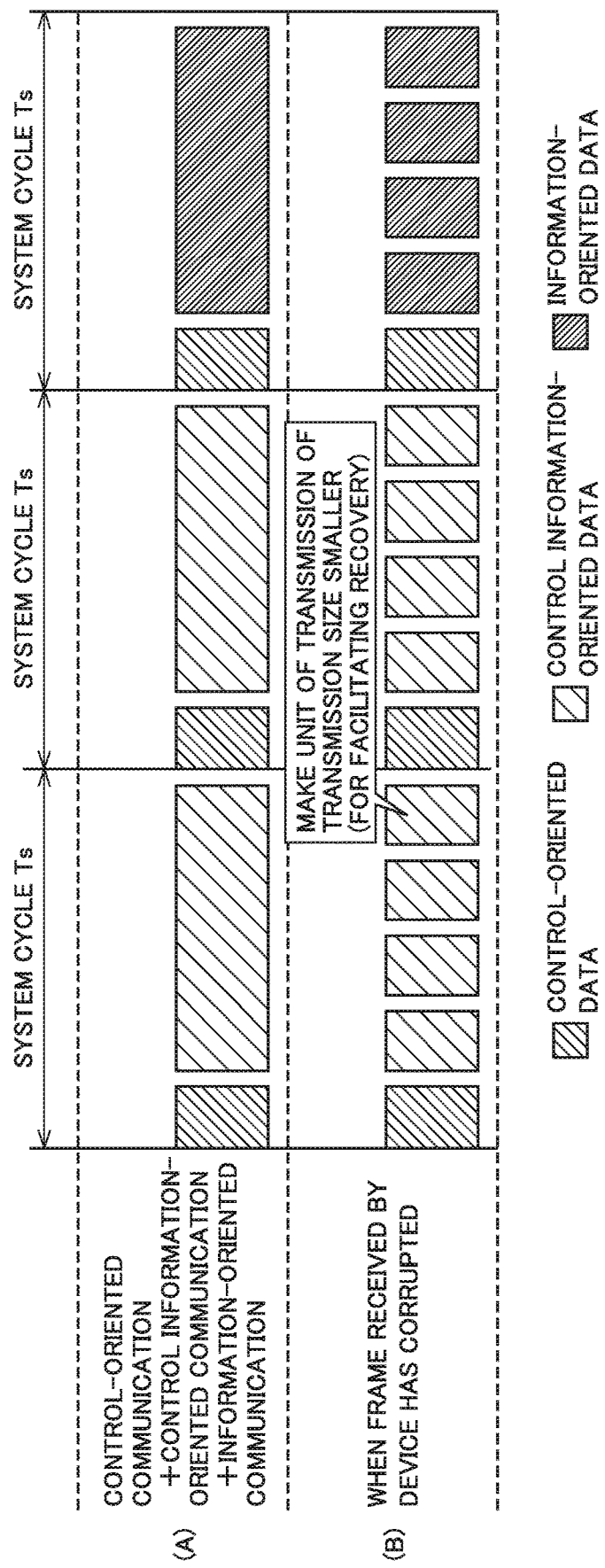
FIG. 12 is a schematic diagram for illustrating processing in a communication condition management mode in communication processing according to the present embodiment.

FIG. 12 is a schematic diagram for illustrating processing in the communication condition management mode in communication processing according to the present embodiment. FIG. 12 shows communication processing when control information-oriented data in addition to control-oriented data is transmitted to a specific device.

In the communication condition management mode shown in FIG. 12 as well, basic scheduling in a communication band is the same as in the communication time period management mode described above. Therefore, detailed description of processing the same as in the communication time period management mode described above will not be repeated.

As shown in FIG. 12(A), when control information-oriented communication and information-oriented communication are allocated in accordance with principles of maximum use of a remaining communication band for another communication with highest priority being placed on control-oriented communication, a size of control information-oriented data and information-oriented data is relatively large. By increasing a data size, communication overhead is decreased and efficiency in use of a network can be enhanced. On the other hand, when transmission and reception of data fails due to influence by various noises introduced in a communication path, processing for re-sending data is performed. In consideration of such re-sending processing, a data size is desirably small as much as possible. Since only a portion of which transmission and reception has failed should only be sent again, recovery can be made more efficient. Thus, when a data size is large, a data size in re-sending processing is also large, however, recovery can be facilitated by making a unit of re-sending smaller.

Therefore, when a condition of communication is good, a probability of necessity for re-sending processing is low and hence a data size is maximized. On the other hand, when a condition of communication is not good, a probability of necessity for re-sending processing is high and hence a data size (a unit size) is preferably made smaller to an appropriate size.

Since communication overhead is produced by change in unit of transmission, it is applied to control information-oriented communication and information-oriented communication but preferably not applied to control-oriented communication. Since a real-time ability is not required basically for information-oriented communication, a user may be allowed to select as appropriate whether or not to change a unit of transmission.

Figure 13:
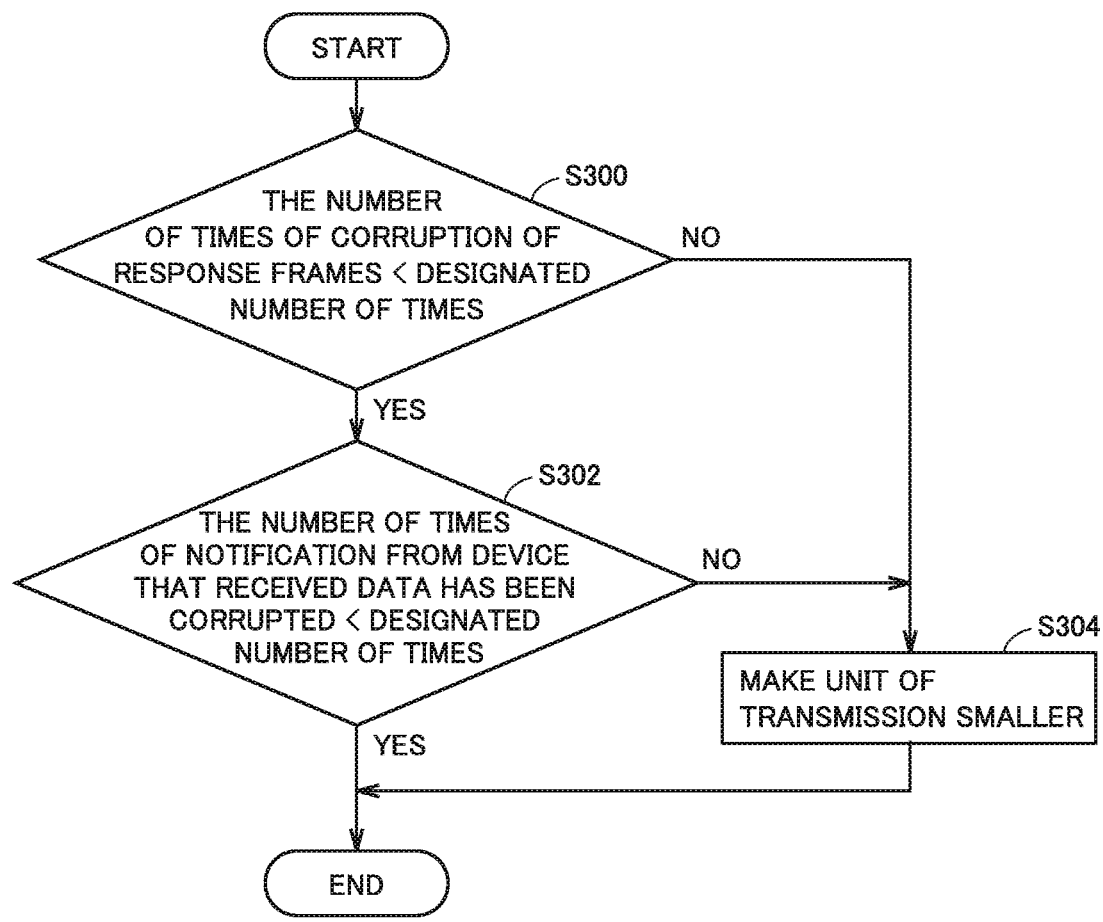
FIG. 13 is a flowchart showing a processing procedure in the communication condition management mode in communication processing according to the present embodiment.

FIG. 13 is a flowchart showing a processing procedure in the communication condition management mode in communication processing according to the present embodiment. A processing procedure shown in FIG. 13 is typically performed by processor 102 (FIG. 3) of control device 100 during communication processing. Specifically, a communication cycle is dynamically set in accordance with a time interval in which a communication counterpart device is capable of reception.

Referring to FIG. 13, control device 100 determines whether or not the number of times of corruption of a frame of a reception response from a destination is smaller than a designated number of times (step S300). The number of times of corruption of the frame of the reception response from the destination may be counted for each destination device by control device 100 or obtained from an entity which manages communication. When the number of times of corruption of the frame of the reception response from the destination has reached the designated number of times (NO in step S300), processing in step S304 is performed.

When the number of times of corruption of the frame of the reception response from the destination is smaller than the designated number of times (YES in step S300), whether or not the number of times of notification from the destination device that received data has corrupted is smaller than a designated number of times is determined (step S302). When the number of times of notifications from the destination device that the received data has corrupted has reached the designated number of times (NO in step S302), processing in step S304 is performed.

When occurrence of some kind of error is detected in step S300 or S302, control device 100 makes a unit of transmission of data to be transmitted smaller (step S304).

When no error is detected in step S300 or S302, control device 100 continues communication in accordance with an initially set data size.

According to the communication condition management mode, total efficiency in transmission including re-sending processing can be enhanced by making a unit of transmission smaller under such a condition that noise is high and a communication environment is bad. On the other hand, overhead increases. Therefore, when designated time (time of arrival) in control information-oriented communication cannot be guaranteed due to increase in overhead, a notification about a fault condition in communication may be given by an appropriate method. Upon receiving a notification about such a fault condition in communication, a user can take such measures as relaxation of a requirement for designated time (time of arrival) or reduction in amount of application processing on a device side.

Thus, in the communication condition management mode in communication processing according to the present embodiment, a unit size of transmission of control information-oriented data (second data) as being divided is varied in accordance with a condition of communication over a network. In addition, in the communication condition management mode in communication processing according to the present embodiment, a unit size of transmission also of information-oriented data (third data) being divided may be varied in accordance with a condition of communication over a network. Though the number of corrupted reception responses among reception responses from a destination and the number of notifications from the destination indicating corruption of received data are given as examples of a method of determining a condition of communication over a network, any information may be used without being limited as such.

(e5. Others)

In the processing procedure described above, for the sake of simplification of description, a processing example in which control information-oriented communication is equally handled is shown. Different priority or designated time (time of arrival), however, may be set for each control information-oriented communication. For example, relatively high priority may be set for notification of information on a fault condition as will be described later, whereas relatively low priority may be set for setting of a parameter.

Control information-oriented data on which high priority is set may further be prioritized and processed in accordance with such setting of priority.

<F: Application>

An application of communication processing according to the present embodiment will now be described.

(f1: First Application)

Figure 14:
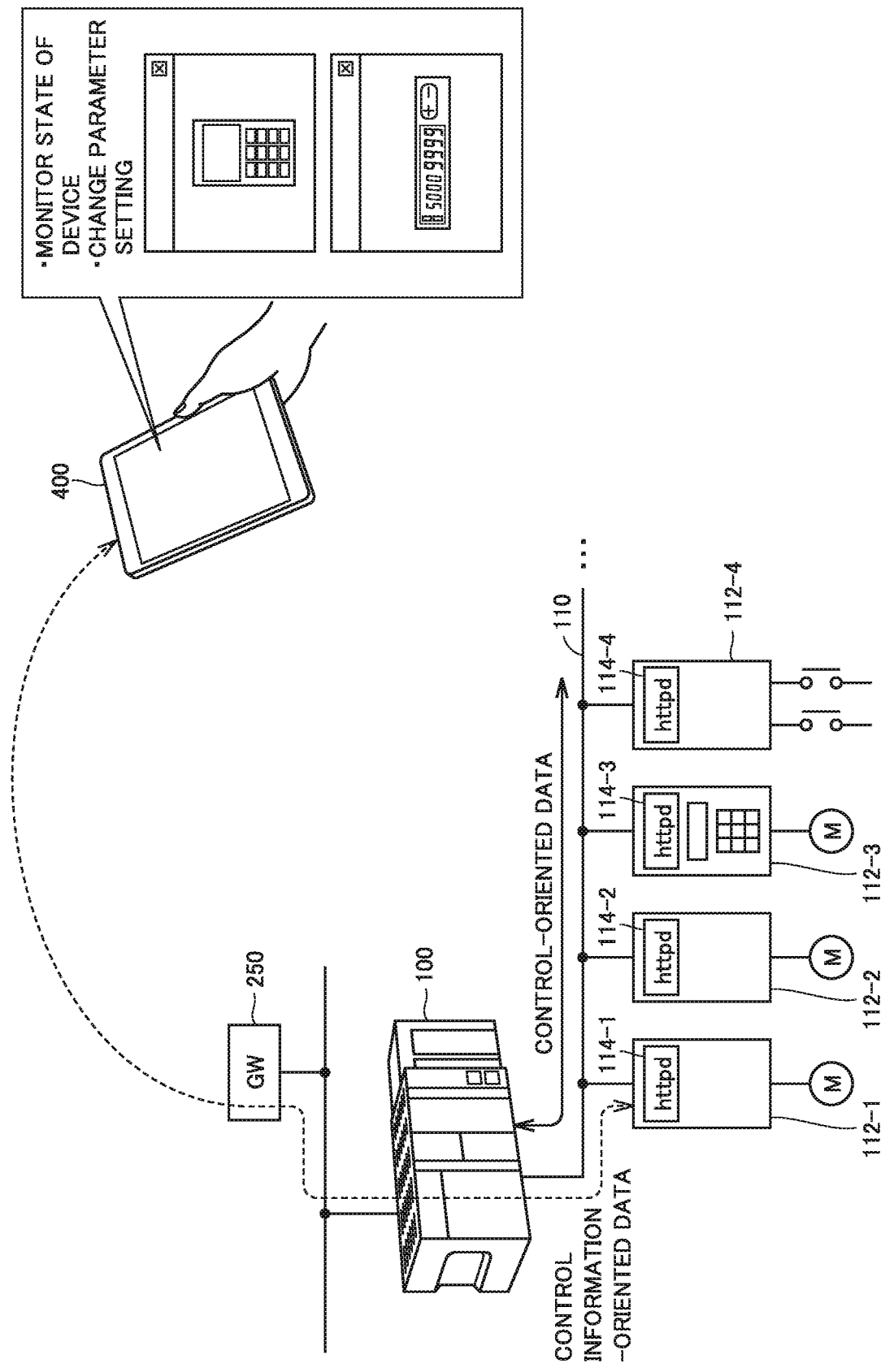
FIG. 14 is a schematic diagram for illustrating a first application of the communication processing according to the present embodiment.

FIG. 14 is a schematic diagram for illustrating a first application of the communication processing according to the present embodiment. FIG. 14 shows an application in which a state of a device is remotely monitored or setting of a parameter is changed during operations of control device 100 and the device.

More specifically, referring to FIG. 14, a plurality of devices 112-1 to 112-4 are connected to control device 100 over field network 110. Control-oriented data is exchanged in accordance with a predetermined system cycle between control device 100 and devices 112-1 to 112-4. A control operation by control device 100 and the devices can be performed by exchange of such control-oriented data.

A gateway 250 is connected to control device 100 over a higher-order network and gateway 250 mediates an external access. For example, a remote maintenance terminal 400 implemented by a tablet terminal or a smartphone can access control device 100 and each device connected to field network 110 of control device 100 through gateway 250.

In addition to control-oriented data as described above, control information-oriented data is transmitted over field network 110. For example, in order to provide an access to information managed by each of devices 112-1 to 112-4, devices 112-1 to 112-4 execute hypertext transfer protocol (HTTP) host programs 114-1 to 114-4, respectively. Control information-oriented data typically includes data involved with exchange between remote maintenance terminal 400 and each of HTTP host programs 114-1 to 114-4.

With the communication method according to the present embodiment, control information-oriented data can also be exchanged without interfering with regularly performed exchange of control-oriented data over field network 110. Therefore, a user can access a specific device through remote maintenance terminal 400 and monitor a state of the device or change setting of a parameter on remote maintenance terminal 400.

When transmission of control information-oriented data is not successful, visit to a site where each device is installed to operate a button provided in each device or a setting tool by connecting a personal computer or the like to each device has been required. By using remote maintenance terminal 400, however, remotely, a state of a plurality of devices can be monitored or setting of parameters thereof can be modified.

(f2: Second Application)

Figure 15:
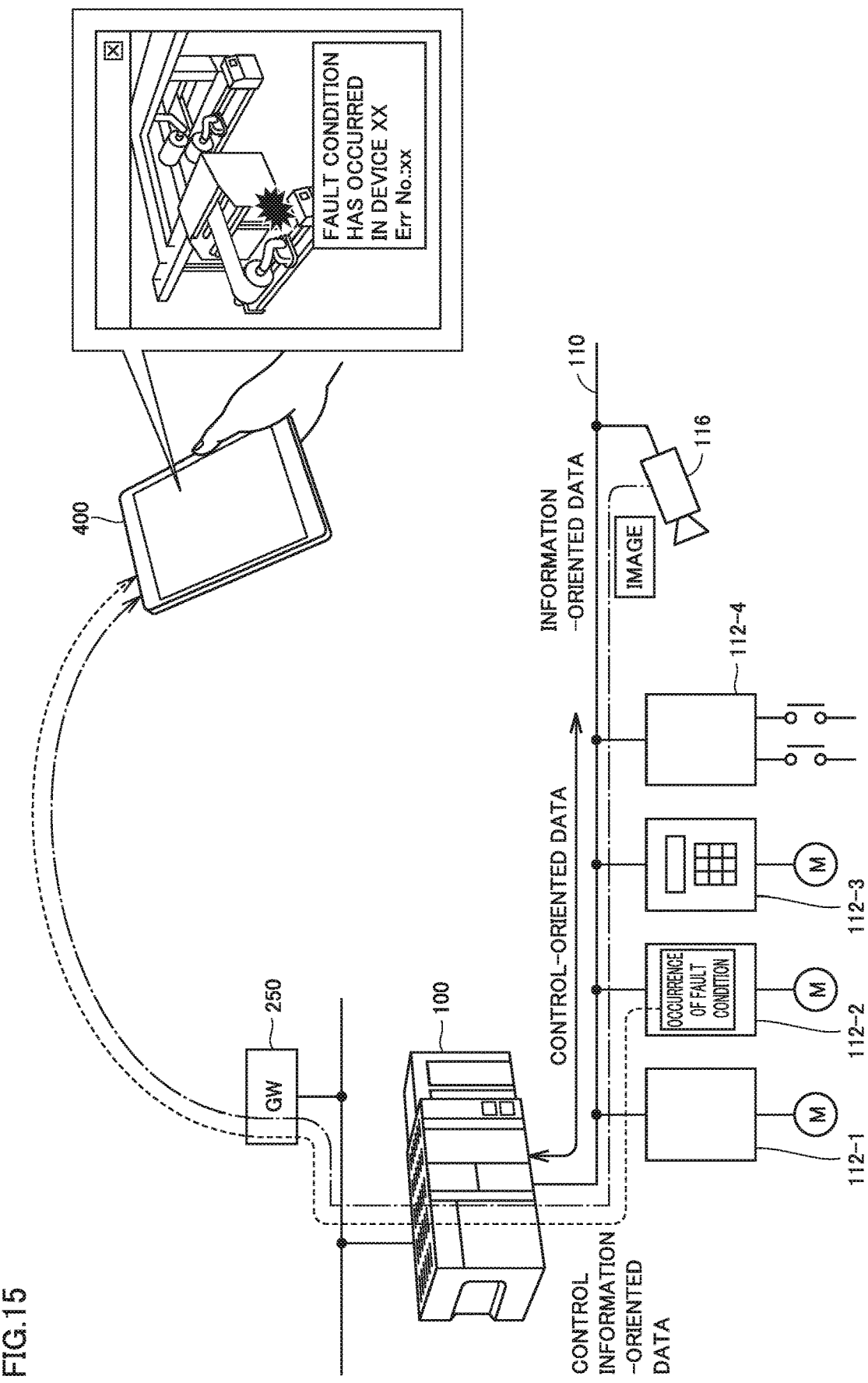
FIG. 15 is a schematic diagram for illustrating a second application of the communication processing according to the present embodiment.

FIG. 15 is a schematic diagram for illustrating a second application of the communication processing according to the present embodiment. FIG. 15 shows an application in which a notification is given and a condition is checked when some kind of a fault condition occurs in any device during operations of control device 100 and the device.

More specifically, referring to FIG. 15, a plurality of devices 112-1 to 112-4 and a camera 116 are connected to control device 100 over field network 110. Control-oriented data is exchanged between control device 100 and devices 112-1 to 112-4 in accordance with a predetermined system cycle. A control operation by control device 100 and the devices can be performed by exchanging such control-oriented data.

Gateway 250 is connected to control device 100 over a higher-order network and gateway 250 mediates an external access. For example, remote maintenance terminal 400 implemented by a tablet terminal or a smartphone can access control device 100 and each device connected to field network 110 of control device 100 through gateway 250.

For example, an image picked up by camera 116 connected to field network 110 is transferred to remote maintenance terminal 400 in the order of control device 100 and gateway 250 during operations by the devices (during normal operations). A user (serviceperson) of remote maintenance terminal 400 can remotely monitor a condition through images shown on remote maintenance terminal 400.

An image picked up during the normal operations may be transmitted over field network 110 as information-oriented data.

For example, when some kind of a fault condition occurs in device 112-2, device 112-2 transmits contents of information on the fault condition over field network 110. That message is transferred to remote maintenance terminal 400 in the order of control device 100 and gateway 250. In addition, the image picked up by camera 116 is also transferred to remote maintenance terminal 400. Remote maintenance terminal 400 presents the image picked up by camera 116 and received information on the fault condition to a user (serviceperson) of remote maintenance terminal 400. By way of example of presentation, augmented reality (AR) as shown in FIG. 15 may be used. The contents of the information on the fault condition may be shown in association with a portion of occurrence of the fault condition on the actually picked up image, based on the received information on the fault condition.

Such information on the fault condition is transmitted over field network 110 as control information-oriented data without interfering with normal transmission of control-oriented data.

With the communication method according to the present embodiment, a picked up image and information on a fault condition representing a fault condition which has occurred can be synchronized with each other in a representation (an AR representation) on remote maintenance terminal 400, by transmitting at the time of occurrence of the fault condition, the image and the information on the fault condition as control information-oriented data while time of arrival thereof is guaranteed. A user serviceperson can reliably remotely know contents of occurrence of the fault condition through such synchronized representation. If the image is transmitted as information-oriented data as in the normal operations, the image shown on remote maintenance terminal 400 does not match with the time in the information on the fault condition and a shown picture may be inappropriate (for example, though information on a fault condition is shown, a picked up image shows a normal state).

By adopting such a configuration, a user (serviceperson) can specify a portion of occurrence of some kind of fault condition on a lower device level when such a fault condition occurs in a control system and can remotely check also a condition thereof so that maintainability can be enhanced and time until recovery from failure can be shortened.

(f3: Third Application)

Figure 16:
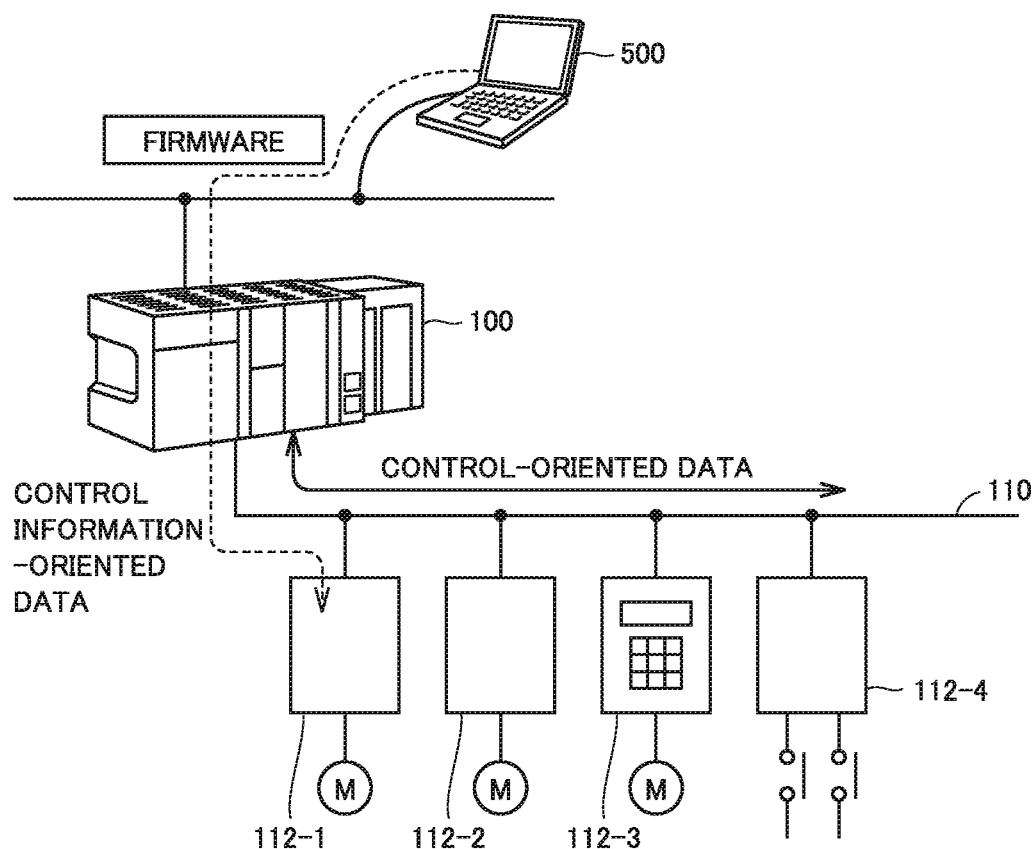
FIG. 16 is a schematic diagram for illustrating a third application of the communication processing according to the present embodiment.

FIG. 16 is a schematic diagram for illustrating a third application of the communication processing according to the present embodiment. FIG. 16 shows an application in which firmware for any device is updated during operations of control device 100.

More specifically, referring to FIG. 16, a plurality of devices 112-1 to 112-4 are connected to control device 100 over field network 110. Control-oriented data is exchanged between control device 100 and devices 112-1 to 112-4 in accordance with a predetermined system cycle. A control operation by control device 100 and the devices can be performed by exchanging such control-oriented data.

A maintenance apparatus 500 is connected to control device 100 over a higher-order network. Maintenance apparatus 500 stores firmware for any device. A user (serviceperson) operates maintenance apparatus 500 to designate any device connected to field network 110 of control device 100 and to transmit the firmware stored in maintenance apparatus 500 to the designated device. Such firmware is transmitted over field network 110 as control information-oriented data without interfering with normal transmission of control-oriented data.

When control information-oriented data is not successfully transmitted, visit to a site where each device is installed for performing an operation to update firmware by directly connecting the maintenance apparatus to a device of interest has been required. In particular, when the device of interest is arranged in a control panel or in an apparatus, time and efforts have been required for updating firmware. In contrast, by adopting the configuration as shown in FIG. 16, firmware for a plurality of devices can be updated at one location in a centralized manner so that maintainability can be enhanced and cost required for maintenance can be reduced.

<G. Advantages>

With the communication method according to the present embodiment, control information-oriented data of which delivery to a destination within a designated period of time is required and information-oriented data larger in data size can together be transmitted while updating of data used for control of a manufacturing apparatus or a production facility (control-oriented data) over an identical network every predetermined cycle is guaranteed. By implementing such a communication method, the entire network including a lower-order device can be more sophisticated.

It should be understood that the embodiment disclosed herein is illustrative and non-restrictive in every respect. The scope of the present invention is defined by the terms of the claims rather than the description above and is intended to include any modifications within the scope and meaning equivalent to the terms of the claims.

REFERENCE SIGNS LIST 1 networked system; 11, 12, 13, 14 network; 100 control device; 102 processor; 104 memory; 106 storage; 107 system program; 108 user application program; 110, 120 field network; 112, 122 device group; 112-1 to 112-4 device; 114-1 to 114-4 HTTP host program; 116 camera; 130 network controller; 131, 141, 151, 161 reception circuit; 132, 142, 152, 162 reception buffer; 133, 143, 153, 163 transmission and reception controller; 134, 144, 154, 164 transmission buffer; 135, 145, 155, 165 transmission circuit; 140, 150 field network controller; 160 internal bus controller; 170 scheduler; 172 management mode; 173 user application execution processing; 174 peripheral processing; 175 control-oriented communication processing; 176 control information-oriented communication processing; 177 information-oriented communication processing; 178 communication driver; 180 display; 190 line management apparatus; 200 manufacturing management apparatus; 210 database apparatus; 250 gateway; 300 production management apparatus; 400 remote maintenance terminal; 500 maintenance apparatus; Ts system cycle

The invention claimed is:

1. A communication apparatus connected to a network over which data is updated every predetermined cycle, the communication apparatus comprising a controller configured to perform operations comprising:

securing a first communication band necessary for updating, in every predetermined cycle, first data to be used for control of a manufacturing apparatus or a production facility;

securing a second communication band, different from the first communication band, necessary for delivering second data to a destination within a designated time period over the network;

securing a third communication band, different from both the first communication band and the second communication band, for transmitting third data over the network;

dividing the second data into pieces of data each having a data size in accordance with a size of data receivable by the destination and the second communication band available in each predetermined cycle, and allocating the divided pieces of data to a plurality of the predetermined cycles; and giving a notification about a fault condition in response to scheduling of delivery of the second data to the destination within the designated time period by division of the second data failing.

2. The communication apparatus according to claim 1, wherein
the controller is configured to perform operations further comprising dividing the second data and successively transmitting the divided pieces of data in a cycle longer than the predetermined cycle in accordance with a condition of processing of received data at the destination.

3. The communication apparatus according to claim 1, wherein
the controller is configured to perform operations further comprising transmitting the second data or the third data a plurality of times in one predetermined cycle.

4. The communication apparatus according to claim 3, wherein
the controller is configured to perform operations further comprising determining a condition of processing of received data at the destination based on at least one of the number of times of a reception error at the destination and the number of times of failure in reception of a reception response from the destination.

5. The communication apparatus according to claim 1, wherein
the controller is configured to perform operations further comprising changing a unit size of transmission of the divided pieces of data, in accordance with a condition of communication over the network.

6. The communication apparatus according to claim 5, wherein
the controller is configured to perform operations further comprising determining a condition of communication over the network based on at least one of a number of corrupted reception responses among reception responses from the destination and a number of notifications from the destination indicating corruption of received data.

7. The communication apparatus according to claim 5, wherein
the controller is configured to perform operations further comprising changing a unit size of transmission of divided pieces of the third data, in accordance with the condition of communication over the network, in response to the change in unit size being designated.

8. The communication apparatus according to claim 1, wherein the controller is configured such that giving the notification about the fault condition comprises at least one of:

turning on a system flag managed by the communication apparatus, and turning on an indicator located on a display surface of the communication apparatus.

9. A control device which controls a manufacturing apparatus or a production facility, the control device comprising:

a communication interface connected to a network over which data is updated every predetermined cycle; and a controller configured to perform operations comprising:

securing a first communication band necessary for updating, in every predetermined cycle, first data to be used for control of the manufacturing apparatus or the production facility, securing a second communication band, different from the first communication band, necessary for delivering second data to a destination within a designated time period over the network securing a third communication band, different from the first communication band and the second communication band, for transmitting third data over the network, dividing the second data into pieces of data each having a data size in accordance with a size of data receivable by the destination and the second communication band available in each predetermined cycle, and allocating the divided pieces of data to a plurality of the predetermined cycles, and giving a notification about a fault condition in response to scheduling of delivery of the second data to the destination within the designated time period by division of the second data failing.

10. The control device according to claim 9, wherein the controller is configured such that giving the notification about the fault condition comprises at least one of:

turning on a system flag managed by the controller, and turning on an indicator located on a display surface of the controller.

11. A method of communication over a network over which data is updated every predetermined cycle, the method of communication comprising:

securing a first communication band necessary for updating, in every predetermined cycle, first data to be used for control of a manufacturing apparatus or a production facility;

securing a second communication band, different from the first communication band, necessary for delivering second data to a destination within a designated time period over the network;

securing a third communication band, different from the first communication band and the second communication band, for transmitting third data over the network;

dividing the second data into pieces of data each having a data size in accordance with a size of data receivable by the destination and the second communication band available in each predetermined cycle, and allocating the divided pieces of data to a plurality of the predetermined cycles; and giving a notification about a fault condition in response to scheduling of delivery of the second data to the destination within the designated time period by division of the second data failing.

12. The method according to claim 11, wherein giving the notification about the fault condition comprises at least one of:

turning on a system flag managed by a communication apparatus, and turning on an indicator located on a display surface of the communication apparatus.

\* \* \* \* \*